(12) United States Patent
Jung et al.

(10) Patent No.: US 11,084,250 B2
(45) Date of Patent: Aug. 10, 2021

(54) DISPLAY AND ELECTRONIC DEVICE COMPRISING SAME

(71) Applicant: Samsung Electronics Co., Ltd., Gyeonggi-do (KR)

(72) Inventors: Song Hee Jung, Gyeonggi-do (KR); Youngdo Kim, Gyeonggi-do (KR); Joohyun Kim, Seoul (KR); Taesung Kim, Gyeonggi-do (KR); Hyunchang Shin, Gyeonggi-do (KR); Keunsik Lee, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/075,888

(22) PCT Filed: Jan. 31, 2017

(86) PCT No.: PCT/KR2017/001020
§ 371 (c)(1),
(2) Date: Aug. 6, 2018

(87) PCT Pub. No.: WO2017/135651
PCT Pub. Date: Aug. 10, 2017

(65) Prior Publication Data
US 2019/0061318 A1 Feb. 28, 2019

(30) Foreign Application Priority Data
Feb. 5, 2016 (KR) .................. 10-2016-0015226

(51) Int. Cl.
*B32B 3/26* (2006.01)
*B32B 7/14* (2006.01)
(Continued)

(52) U.S. Cl.
CPC .................. *B32B 7/14* (2013.01); *B32B 3/30* (2013.01); *B32B 5/142* (2013.01); *B32B 7/02* (2013.01);
(Continued)

(58) Field of Classification Search
CPC .... B32B 7/02; B32B 7/12; B32B 3/26; B32B 3/263; B32B 3/30; B32B 2307/412;
(Continued)

(56) References Cited

U.S. PATENT DOCUMENTS

2012/0154707 A1 6/2012 Hsieh et al.
2013/0100053 A1 4/2013 Kang et al.
(Continued)

FOREIGN PATENT DOCUMENTS

EP 2 821 843 1/2015
KR 1020140111884 9/2014
(Continued)

OTHER PUBLICATIONS

PCT/ISA/210 Search Report issued on PCT/KR2017/001020 (pp. 3).
(Continued)

*Primary Examiner* — Megha M Gaitonde
(74) *Attorney, Agent, or Firm* — The Farrell Law Firm, P.C.

(57) ABSTRACT

According to various embodiments, a display or an electronic device comprising the same comprises: a first layer comprising a first member; a second layer which is formed beneath the first layer, the second layer comprising a second member; and a third layer which is formed between the first layer and the second layer, the third layer comprising an adhesive member. The third layer has a first area which may be formed by using a first adhesive member having a first attribute, and a second which may be formed by using a
(Continued)

second adhesive member having a second attribute. In addition, other various embodiments are also possible.

17 Claims, 43 Drawing Sheets

(51) Int. Cl.
*G09F 9/30* (2006.01)
*G02F 1/1333* (2006.01)
*H04M 1/02* (2006.01)
*G06F 3/041* (2006.01)
*H01L 27/32* (2006.01)
*G02F 1/1335* (2006.01)
*G06F 1/16* (2006.01)
*B32B 5/14* (2006.01)
*B32B 3/30* (2006.01)
*B32B 7/02* (2019.01)

(52) U.S. Cl.
CPC .......... *G02F 1/1333* (2013.01); *G02F 1/1335* (2013.01); *G02F 1/13338* (2013.01); *G02F 1/133305* (2013.01); *G02F 1/133308* (2013.01); *G02F 1/133528* (2013.01); *G06F 1/1652* (2013.01); *G06F 3/041* (2013.01); *G06F 3/0412* (2013.01); *G09F 9/30* (2013.01); *H01L 27/32* (2013.01); *H04M 1/02* (2013.01); *B32B 2255/00* (2013.01); *B32B 2307/412* (2013.01); *B32B 2307/42* (2013.01); *B32B 2307/546* (2013.01); *B32B 2457/208* (2013.01); *G02F 2201/50* (2013.01); *G02F 2202/28* (2013.01); *G06F 2203/04102* (2013.01); *G06F 2203/04103* (2013.01)

(58) Field of Classification Search
CPC .......... B32B 2307/42; B32B 2307/546; B32B 2457/208; G02F 1/133305; G02F 1/133308; G02F 1/13338; G02F 1/1335; G02F 1/133528; G02F 2201/50; G02F 2201/503; G02F 2202/28; Y10T 428/24479; Y10T 428/24504; Y10T 428/24512; Y10T 428/24521; Y10T 428/24529; Y10T 428/24595; Y10T 428/24612; Y10T 428/2462; Y10T 428/24942; Y10T 428/2495; Y10T 428/24992
USPC ....... 428/156, 159, 160, 161, 162, 170, 172, 428/212, 213, 218, 220
See application file for complete search history.

(56) References Cited

U.S. PATENT DOCUMENTS

| 2014/0029212 | A1  | 1/2014  | Hwang et al. |
| 2014/0267950 | A1  | 9/2014  | Kang et al. |
| 2014/0295150 | A1  | 10/2014 | Bower et al. |
| 2015/0043174 | A1* | 2/2015  | Han ................. G06F 1/1626 428/156 |
| 2015/0049428 | A1* | 2/2015  | Lee ................. G06F 1/1652 361/679.27 |
| 2015/0141074 | A1  | 5/2015  | Shim et al. |
| 2015/0268697 | A1  | 9/2015  | Nam et al. |
| 2016/0243791 | A1  | 8/2016  | Court |
| 2017/0130100 | A1  | 5/2017  | Lee |

FOREIGN PATENT DOCUMENTS

| KR | 1020150108990 | 10/2015 |
| KR | 1020150109238 | 10/2015 |

OTHER PUBLICATIONS

PCT/ISA/237 Written Opinion issued on PCT/KR2017/001020 (pp. 6).
European Search Report dated Dec. 20, 2018 issued in counterpart application No. 17747696.7-1221, 9 pages.
European Search Report dated Jan. 28, 2021 issued in counterpart application No. 17747696.7-1203, 9 pages.
Indian Examination Report dated Feb. 26, 2021 issued in counterpart application No. 201847032470, 7 pages.

* cited by examiner

DISPLAY AND ELECTRONIC DEVICE COMPRISING SAME

PRIORITY

This application is a National Phase Entry of PCT International Application No. PCT/KR2017/001020, which was filed on Jan. 31, 2017, and claims priority to Korean Patent Application No. 10-2016-0015226, which was filed on Feb. 5, 2016, the contents of each of which are incorporated herein by reference.

TECHNICAL FIELD

Various embodiments of the present disclosure relate to a display and, for example, to a display using various adhesives and an electronic device including the same.

BACKGROUND ART

Development of electronic devices can be applied to various fields correlating closely with our daily life. As such electronic devices are released in various sizes according to functions thereof and user preference, efforts have been made to develop a device that has not only various functions and slimness but also a design more excellent and aesthetic than devices of other companies even though the device has almost the same functions as those of other companies, has excellent fatigue resistance to frequent opening or closing, and has excellent durability to tolerate external impact (dropping, etc.).

DETAILED DESCRIPTION OF THE INVENTION

Technical Problem

According to various embodiments, an electronic device including a display may have various shapes. According to an embodiment, an electronic device including a display occupying most of an area of a front surface may be configured as a bar type. According to an embodiment, an electronic device may be configured to be a foldable type installed to allow opening or closing with reference to a predetermined rotation axis over a first body thereof. According to an embodiment, an electronic device may be configured to be a slide type allowing a second body thereof to be opened or closed by a sliding movement on a first body thereof. According to an embodiment, an electronic device may be formed into a shape changeable type, the shape of which is changed by a changeable configuration of a body thereof. According to an embodiment, an electronic device formed into a shape changeable type may include a flexible display. Such a flexible display may be configured to allow input or output of data even when the shape thereof has been changed.

According to an embodiment, a part of the flexible display deformed due to frequent shape deformation (e.g., folding) may suffer from cumulative fatigue. The cumulative fatigue may cause malfunctioning at the deformation part. In addition, since a flexible display is required to have a deformable shape, a flexible film window may be used instead of a rigid window applied to a normal rigid body display (e.g., glass). For this reason, the display is unable to avoid having weak impact-resistance and may have a problem, such as hardness degradation, a bright spot due to impact, etc., caused by external impact, pressing, scratching, dropping, etc.

Various embodiments of the present disclosure can provide a display using various adhesives and an electronic device including the same.

Various embodiments can provide a display using various adhesives to have excellent deformation characteristics (e.g., a folding characteristic, etc.) and an electronic device including the same.

Various embodiments can provide a display using various adhesives to have excellent impact-resistance, which prevents malfunction of and damage to the display even due to external impact, and an electronic device including the same.

Technical Solution

Various embodiments can provide a display and an electronic device comprising the same, the display including: a first layer including a first member; a second layer which is formed beneath the first layer, the second layer including a second member; and a third layer which is formed between the first layer and the second layer, the third layer including an adhesive member, wherein the third layer has a first area which may be formed by using a first adhesive member having a first attribute, and a second area which may be formed by using a second adhesive member having a second attribute.

Advantageous Effects

Various embodiments of the present disclosure can provide: a display wherein an adhesive member for coupling each member is configured to have different characteristics for each area thereof so as to have excellent deformation characteristics and enable implementation of excellent durability against external impact; and an electronic device including the same.

MODE FOR CARRYING OUT THE INVENTION

Figure 1:
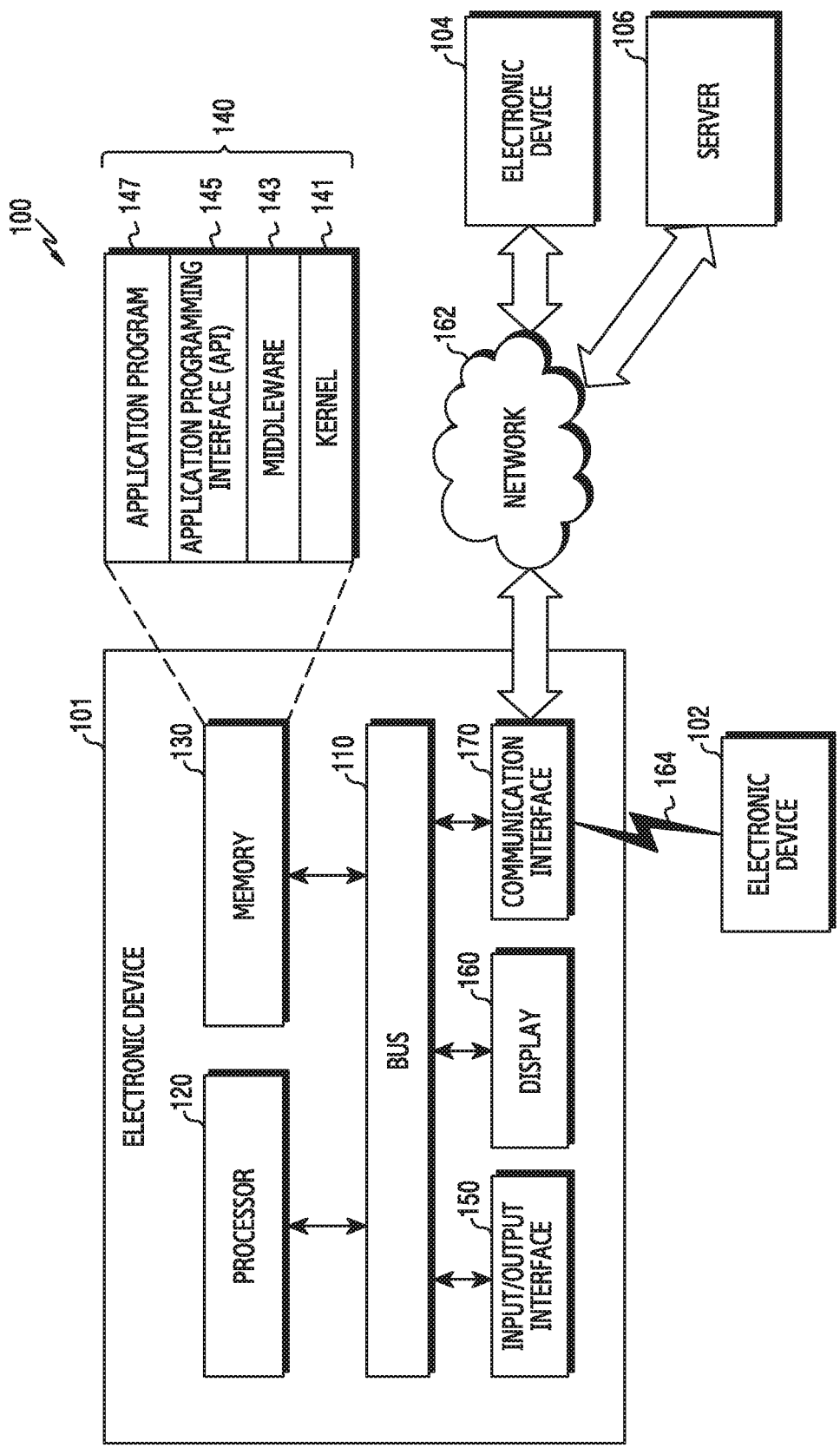
FIG. 1 is a view illustrating a network environment that includes an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 is a view illustrating a network environment that includes an electronic device according to various embodiments.

Descriptions will be made on an electronic device 101 within a network environment 100 in various embodiments with reference to FIG. 1. The electronic device 101 may include a bus 110, a processor 120, a memory 130, an input/output interface 150, a display 160, and a communication interface 170. In a certain embodiment, the electronic device 101 may omit at least one of the above-mentioned components or may additionally include other components.

The bus 110 may include, for example, a circuit that interconnects the above-mentioned components 110 to 170 and transmits communication (e.g., a control message or data) among the components.

The processor 120 may include one or more of a Central Processing Unit (CPU), an Application Processor (AP), and a Communication Processor (CP). The processor 120 may execute, for example, an arithmetic operation or data processing that is related to a control and/or communication of one or more other components of the electronic device 101.

The memory 130 may include a volatile memory and/or a non-volatile memory. The memory 130 may store, for example, commands or data that are related to one or more other components of the electronic device 101. According to one embodiment, the memory 130 may store software and/or a program 140. The program 140 may include, for example, a kernel 141, a middleware 143, an Application Programming Interface (API) 145, and/or an application program (or an "application") 147. At least one of the kernel 141, the middleware 143, and the API 145 may be referred to as an Operating System (OS).

The kernel 141 may control or manage, for example, system resources (e.g., the bus 110, the processor 120, or the memory 130) that are used for executing operations or functions implemented in the other programs (e.g., the middleware 143, the API 145, or the application programs 147). In addition, the kernel 141 may provide an interface that allows the middleware 143, the API 145, or the application programs 147 to access individual components of the electronic device 101 so as to control or manage the system resources.

The middleware 143 may play an intermediary role such that, for example, the API 145 or the application programs 147 may communicate with the kernel 141 so as to exchange data.

In addition, the middleware 143 may process one or more task requests which are received from the application programs 147, according to priority. For example, the middleware 143 may assign the priority to be capable of using a system resource of the electronic device 101 (e.g., the bus 110, the processor 120, or the memory 130) to at least one of the application programs 147. For example, the middleware 143 may perform scheduling, load balancing, or the like for the one or more task requests by processing the one or more requests according to the assigned priority.

The API 145 is, for example, an interface that allows the applications 147 to control functions provided from the kernel 141 or the middleware 143, and may include, for example, one or more interfaces or functions (e.g., commands) for a file control, a window control, an image processing, a character control, or the like.

The input/output interface 150 may serve as an interface to transmit commands or data entered from, for example, a user or any other external device to the other component(s) of the electronic device 101. Also, the input/output interface 150 may output commands or data, which are received from the other component(s) of the electronic device 101, to the user or the other external device.

The display 160 may include, for example, a Liquid Crystal Display (LCD), a Light Emitting Diode (LED) display, an Organic Light Emitting Diode (OLED) display, or a MicroElectroMechanical systems (MEMS) display, or an electronic paper display. The display 160 may display various contents (e.g., text, image, video, icon, or symbol) to, for example, the user. The display 160 may include a touch screen, and may receive a touch input, a gesture input, a proximity input, or a hovering input that is made using, for example, an electronic pen or a part of the user's body.

The communication interface 170 may set, for example, communication between the electronic device 101 and an external device (e.g., a first external electronic device 102, a second external device 104, or a server 106). For example, the communication interface 170 may be connected with a network 162 through wired or wireless communication so as to communicate with the external device (e.g., the second external electronic device 104 or the server 106).

The wireless communication may use at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), or Global System for Mobile communication (GSM), as a cellular communication protocol. In addition, the wireless communication may include, for example, short range communication 164. The short range communication 164 may include at least one of, for example, Wireless Fidelity (WiFi), Bluetooth, Near Field Communication (NFC), and Global Navigation Satellite System (GNSS). GNSS may include, for example, at least one of Global Positioning System (GPS), Global Navigation Satellite System (Glonass), Beidou Navigation Satellite System (hereinafter, "Beidou"), Galileo, and the European global satellite-based navigation system, according to, for example, a use area or band width. Herein, "GPS" may be interchangeably used with "GNSS" below. The wired communication may use at least one of, for example, Universal Serial Bus (USB), High Definition Multimedia Interface (HDMI), Recommended Standard 232 (RS-232), and Plain Old Telephone Service (POTS). The network 162 may include a telecommunication network (e.g., at least one of a computer network (e.g., LAN or WAN), the internet, and a telephone network).

Each of the first and second external electronic devices 102 and 104 may be a type of device that is the same as, or different from, the electronic device 101. According to one embodiment, the server 106 may include a group of one or more servers.

According to various embodiments, all or some of the operations to be executed by the electronic device 101 may be executed by another electronic device or a plurality of other electronic devices (e.g., the electronic devices 102 and 104 or the server 106). According to one embodiment, in the case where the electronic device 101 should perform a certain function or service automatically or by a request, the electronic device 101 may request some functions or services that are associated therewith from the other electronic devices (e.g., the electronic devices 102 and 104 or the server 106), instead of, or in addition to, executing the functions or service by itself. The other electronic devices (e.g., the electronic devices 102 and 104 or the server 106) may execute the requested functions or additional functions, and may deliver the results to the electronic device 101. The electronic device 101 may provide the requested functions or services by processing the received results as they are or additionally. For this purpose, for example, a cloud computing technique, a distributed computing technique, or a client-server computing technique may be used. As describing the present disclosure, conductive members arranged along an edge of an electronic device have been exemplified to describe a conductive member used as an antenna radiator. However, the antenna radiator is not limited thereto. For example, various structures made of a metal material included in an electronic device may be used as an antenna radiator as well. According to an embodiment, an electronic device applied in an exemplary embodiment of the present disclosure is a bar type electronic device but is not limited thereto. For example, the electronic device may be an electronic device having various opening/closing schemes or a wearable electronic device.

Figure 2:
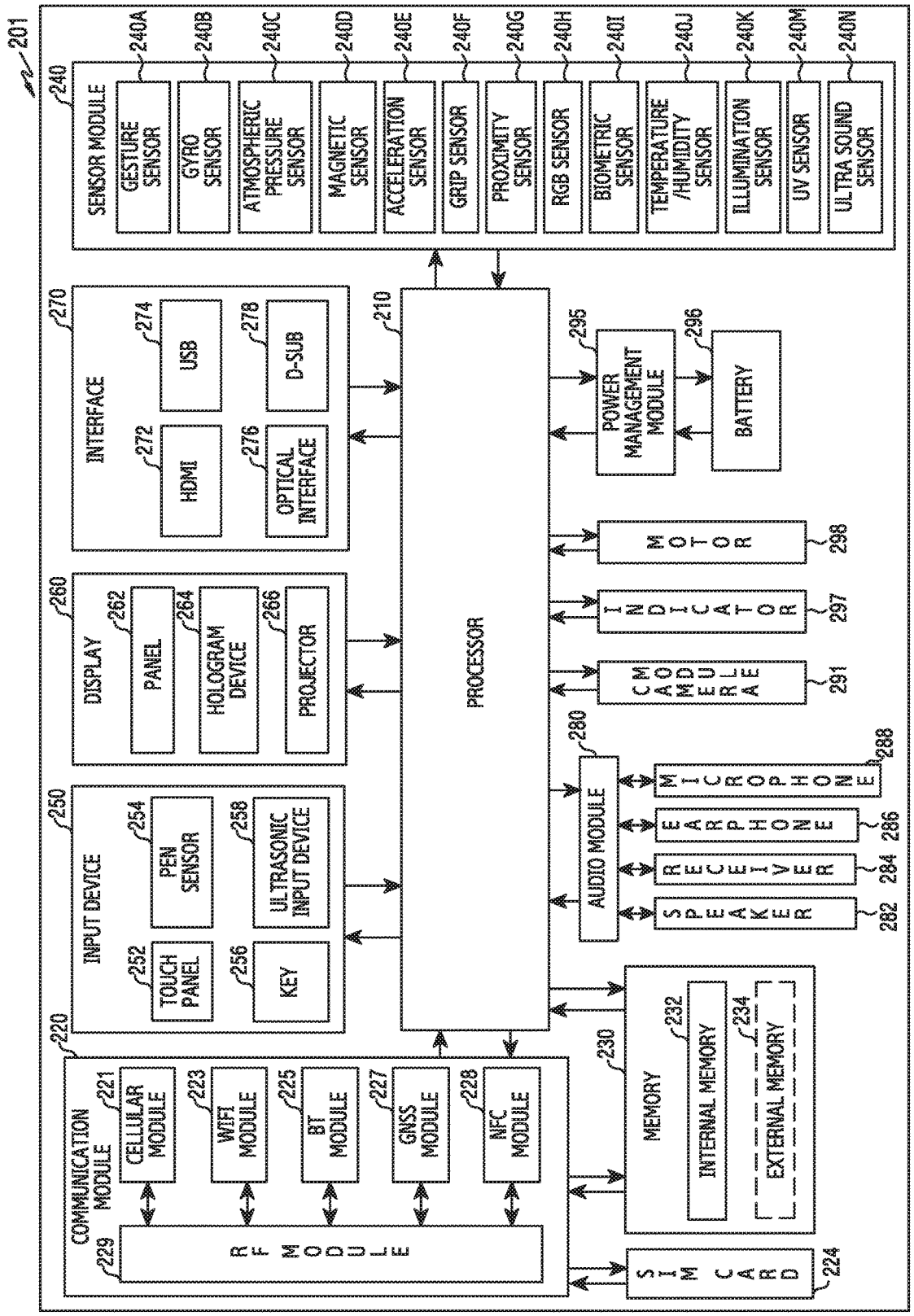
FIG. 2 is a block diagram of an electronic device according to various embodiments of the present disclosure.

FIG. 2 is a block diagram of an electronic device according to various embodiments.

The electronic device 201 may include, for example, the whole or a portion of the electronic device 101 illustrated in FIG. 1. The electronic device 201 may include at least one processor (e.g., an Application Processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or an application program so as to control a plurality of hardware or software components connected thereto, and may also perform various data processing and arithmetic operations. The processor 210 may be implemented by, for example, a System-on-Chip (SoC). According to one embodiment, the processor 210 may further include a Graphic Processing Unit (GPU) and/or an image signal processor. The processor 210 may include at least some components (e.g., the cellular module 221) among the components illustrated in FIG. 2. The processor 210 may load a command or data received from at least one of the other components (e.g., a non-volatile memory) in a volatile memory to process the command and data, and may store various data in a non-volatile memory.

The communication module 220 may have a configuration that is the same as, or similar to, the communication interface 170 of FIG. 1. The communication module 220 may include, for example, a cellular module 221, a WiFi module 223, a Bluetooth module 225, a GNSS module 22d7 (e.g., GPS module, Glonass module, Beidou module, or Galileo module), an NFC module 228, and a Radio Frequency (RF) module 229.

The cellular module 221 may provide, for example, a voice call, a video call, a message service, or an internet service through a communication network. According to one embodiment, the cellular module 221 may perform discrimination and authentication of the electronic device 201 within the communication network by using the subscriber identification module (e.g., a SIM card) 224. According to one embodiment, the cellular module 221 may perform at least some of the multimedia control functions that may be provided by the processor 210. According to one embodiment, the cellular module 221 may include a Communication Processor (CP).

Each of the WiFi module 223, the Bluetooth module 225, the GNSS module 227, and the NFC module 228 may include, for example, a processor to process data transmitted/received through a corresponding module. According to a certain embodiment, at least some (e.g., two or more) of the cellular module 221, the WiFi module 223, the Bluetooth module 225, the GNSS module 227, and the NFC module 228 may be incorporated in a single Integrated Chip (IC) or an IC package.

The RF module 229 may transmit/receive a communication signal (e.g., an RF signal). The RF module 229 may include, for example, a transceiver, a Power Amp Module (PAM), a frequency filter, a Low Noise Amplifier (LNA), or an antenna. According to another embodiment, at least one of the cellular module 221, the WiFi module 223, the Bluetooth module 225, the GNSS module 227, and the NFC module 228 may transmit/receive an RF signal through one or more separate RF modules.

The subscriber identification module 224 may include, for example, a card that includes a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 230 (e.g., the memory 130) may include, for example, an internal memory 232 or an external memory 234. The internal memory 232 may include at least one of, for example, a volatile memory (e.g., Dynamic RAM (DRAM), Static RAM (SRAM), or Synchronous DRAM (SDRAM)), a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory (e.g., NAND flash memory, or NOR flash memory), hard drive, or Solid State Drive (SSD)).

The external memory 234 may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 234 may be functionally and/or physically connected to the electronic device 201 through various interfaces.

For example, the sensor module 240 may measure a physical quantity or may sense an operating status of the electronic device 201, and may then convert the measured or sensed information into electric signals. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature/humidity sensor 240J, an illuminance sensor 240K, and an Ultra-Violet (UV) sensor 240M. Additionally or alternatively, the sensor module 240 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 240 may further include a control circuit for controlling one or more sensors incorporated therein. In a certain embodiment, the electronic device 201 may further include a processor configured to control the sensor module 240 as a part of the processor 210 or separate from the processor 210 so as to control the sensor module 240 while the processor 210 is in the sleep state.

The input device 250 may include a touch panel 252, a (digital) pen sensor 254, a key 256, or an ultrasonic input device 258. As the touch panel 252, at least one of, for example, a capacitive type touch panel, a resistive type touch panel, an infrared type touch panel, and an ultrasonic type panel may be used. Also, the touch panel 252 may further include a control circuit. The touch panel 252 may further include a tactile layer so as to provide a tactile reaction to the user. According to an embodiment, the touch panel 252 may include a pressure sensor (or "force sensor" interchangeably used hereinafter) that is able to measure a pressure intensity in respect of a touch by the user. The pressure sensor may be integrated with the touch panel 252, or be implemented as one or more sensors as distinct from the touch panel 252.

The (digital) pen sensor 254 may be, for example, a portion of the touch panel or may include a separate recognition sheet. The key 256 may include, for example, a physical button, an optical key, or a keypad. The ultrasonic input device 258 may sense, through a microphone (e.g., a microphone 288), ultrasonic waves generated by an input tool so as to confirm data corresponding to the sensed ultrasonic waves.

The display 260 (e.g., the display 160) may include a panel 262, a hologram device 264, or a projector 266. The panel 262 may include a configuration that is the same as, or similar to, that of the display 160 of FIG. 1. The panel 262 may be implemented to be, for example, flexible, transparent, or wearable. The panel 262 may be configured as a single module with the touch panel 252. According to an embodiment, the panel 262 may include a pressure sensor (or force sensor) that is able to measure intensity in respect of a touch by the user. The pressure sensor may be integrated with the touch panel 252, or be implemented as one or more sensors as distinct from the touch panel 252. The hologram device 264 may show a stereoscopic image in the air using interference of light. The projector 266 may project light onto a screen so as to display an image. The screen may be located, for example, inside or outside the electronic device 201. According to one embodiment, the display 260 may further include a control circuit to control the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. For example, the interface 270 may be included in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bi-directionally convert, for example, sound and electric signals. At least some of the components of the audio module 280 may be included in, for example, the input/output interface 150 illustrated in FIG. 1. The audio module 280 may process sound information input or output through, for example, a speaker 282, a receiver 284, an earphone 286, or a microphone 288.

The camera module 291 is a device that is capable of photographing, for example, a still image and a video image, and according to one embodiment, the camera module 291 may include at least one image sensor (e.g., a front sensor or a back sensor), a lens, an Image Signal Processor (ISP), or a flash (e.g., LED or xenon lamp).

The power management module 295 may manage, for example, the electric power of the electronic device 201.

According to one embodiment, the power management module 295 may include a Power Management Integrated Circuit (PMIC), a charger Integrated Circuit (IC), or a battery 296 or fuel gauge. The PMIC may be configured as a wired and/or wireless charge type. The wireless charge type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 296, and a voltage, a current, or a temperature during the charge. The battery 296 may include, for example, a rechargeable battery and/or a solar battery.

The indicator 297 may indicate a specific status (e.g., a booting status, a message status, or a charged status) of the electronic device 201 or of a part thereof (e.g., the processor 210). The motor 298 may convert an electric signal into a mechanical vibration, and may generate, for example, a vibration or a haptic effect. Although not illustrated, the electronic device 201 may include a processor (e.g., a GPU) to support a mobile TV. The processor to support a mobile TV may process media data according to the standards of, for example, Digital Multimedia Broadcasting (DMB), Digital Video Broadcasting (DVB), or MediaFlo™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

According to various embodiments, a flexible display is disposed in an area including both a first body and a first body rotatably installed on the first body, and this display is being discussed in the present disclosure. However, the present disclosure is not limited thereto. A display according to various embodiments of the present disclosure may be also applied to a flexible display which can be deformed during operation or is applied to an uneven area (e.g., an edge portion of an electronic device).

Figure 3A:
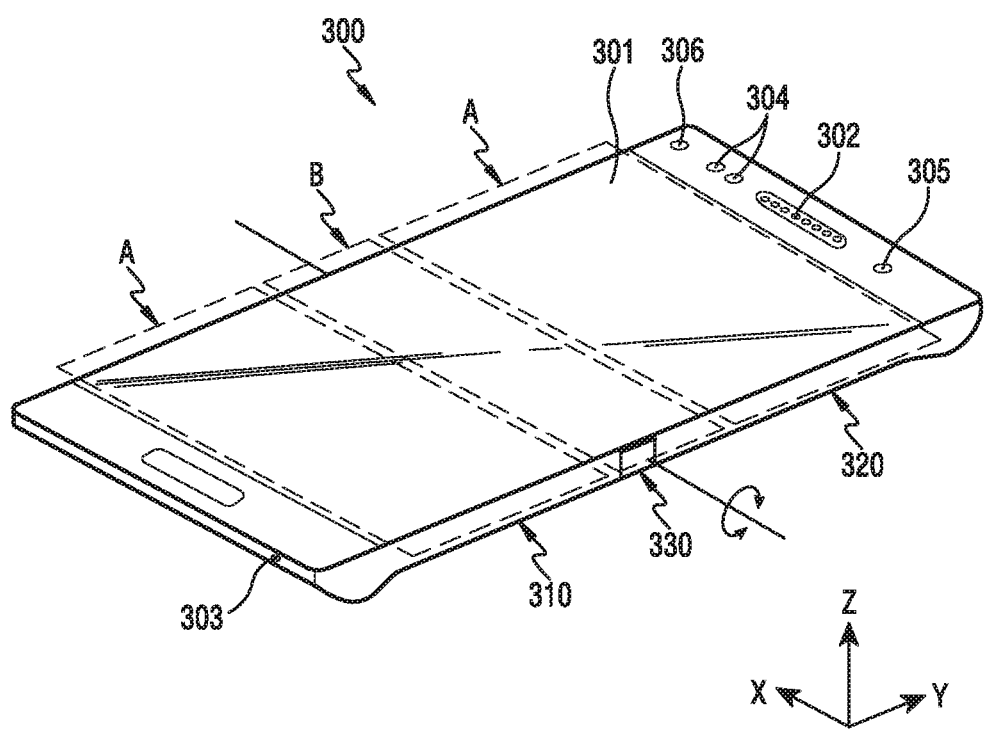
FIGS. 3A and 3B are perspective views of an electronic device according to various embodiments of the present disclosure.
Figure 3B:
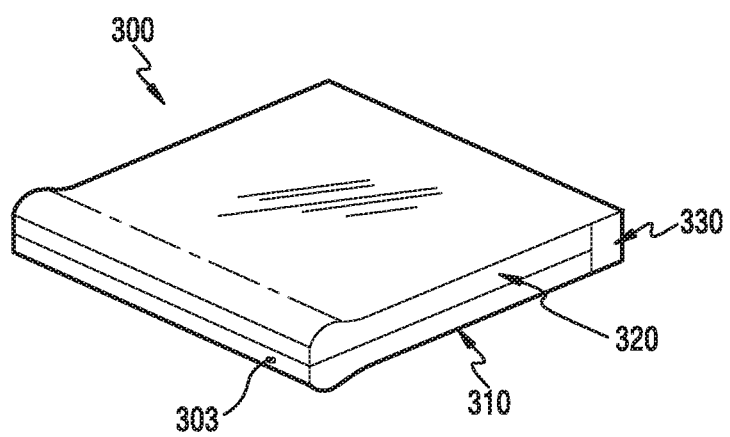

FIGS. 3A and 3B are perspective views of an electronic device 300 according to various embodiments of the present disclosure.

Referring to FIGS. 3A and 3B, the electronic device 300 may include a first body 310 and a second body 320 that is pivotable around a hinge module 330 on the first body 310 so as to be foldable. According to an embodiment, a second body 320 may be foldable about the X-axis as a rotation axis by a hinge module 330 and, when folded, the first body 310 and the second body 320 may be arranged to overlap each other in at least a partial area thereof. In such case, a display 301 seamlessly disposed in most of the areas of the first body 310 and second body 320 may be folded together as well. According to an embodiment, a display 301 may include a flexible display.

According to various embodiments, the electronic device 300 may have a display 301 which is installed thereon so as to include most of the areas of a first body 310 and second body 320 when the second body 320 is moved from the first body 310 to be open. A speaker device 302 for receiving a voice of a counterpart may be installed on one side of the display 301, for example, on the second body 320. A microphone device 303 for transmitting an electronic device user's voice to a counterpart may be installed on the other side of the display 301, for example, on the first body 310.

According to various embodiments, components for performing various functions of the electronic device 300 may be arranged around where the speaker device 302 is installed. The components may include at least one sensor module 304. The sensor module 304 may include at least one of, for example, an illuminance sensor (e.g., an optical sensor), a proximity sensor, an infrared sensor, and an ultrasound sensor. According to one embodiment, the components may also include a camera device 305. According to an embodiment, the components may also include an LED indicator 306 for informing a user of information on a state of the electronic device 300.

According to various embodiments, the electronic device 300 may include an area configured to be folded (area B of FIG. 3A) and an area retaining a flat state invariably (area A of FIG. 3A) when the second body 320 is moved from the first body 310 to be open. According to an embodiment, the display 301 may include a single display (e.g., a flexible display) disposed seamlessly on the upper area of the first body 310, second body 320, and hinge module 330. Therefore, an area configured to be folded (area B of FIG. 3A) may include an area overlapping with the hinge module in a flat state or a nearby area.

According to various embodiments, the display 301 may include an adhesive member (e.g., a Pressure Sensitive Adhesive (PSA) or Optical Clear Adhesive (OCA)) having a particular modulus attribute in order to laminate each member constituting the display 301. For example, when an adhesive member having a hard-type attribute is applied thereto, impact-resistance against external impact may be improved, but a folding feature may be significantly degraded. On the other hand, when an adhesive member having a soft-type attribute is applied thereto, a folding feature may be satisfactory, but impact-resistance against external impact may be significantly degraded.

According to various embodiments of the present disclosure, adhesive members, which are used for specific areas depending on deformation position of the display 301 in response to opening/closing operation of the electronic device 300 and have modulus characteristics different from each other, may be applied to a single adhesive layer.

According to various exemplary embodiments, an adhesive member having a soft-type attribute may be applied to area B which accounts for a deformation feature (e.g., folding feature). According to one exemplary embodiment, (meth)acrylate-based copolymers such as polymers based on (meth)acrylate or urethane acrylate, silicone-based copolymers such as polymers based on (dimethyl)siloxane, and the like may be used as adhesive materials. In greater detail, monomers for use in acrylate-based copolymers may include vinyl acrylate/hydroxy acrylate/urethane acrylate/isocyanate acrylate/carboxylic acid acrylate/hydroxy acrylate monomers, and other materials may be available. For silicone-based copolymers, methyltrichlorosilane/dimethylchlorosilane/trimethylsilyl chloride/organic silane monomers may be used, and other materials are also possible. Vinyl acrylate, hydroxy acrylate, urethane acrylate, isocyanate acrylate, carboxylic acid acrylate, or hydroxy acrylate monomers may be used and other materials are also available. Examples of an available additive include an antistatic agent, a leveling agent, a dispersant, an antioxidant, an antifoaming agent, a lubricant, a UV-blocking agent, a UV absorbent, or a tackifying resin. A preparation method may include mixing a monomer blend and an initiator and conducting photopolymerization, solution polymerization, suspension polymerization, bulk polymerization, or emulsion polymerization. According to one exemplary embodiment, an adhesive member having a modulus of less than $5 \times 10^5$ pascal (Pa) may be applied to area B.

According to various exemplary embodiments, an adhesive member having a hard-type attribute may be applied to area A in which deformation features (e.g., folding features) are not expressed. According to one exemplary embodiment, (meth)acrylate-based copolymers such as polymers based on (meth)acrylate, urethane acrylate, etc., or silicone-based copolymers such as polymers based on (dimethyl)siloxane may be used as tackifying materials. In greater detail, monomers for use in acrylate-based copolymers may include vinyl acrylate, hydroxy acrylate, urethane acrylate, isocyanate acrylate, carboxylic acid acrylate, or hydroxy acrylate monomers, and other materials may be available. For silicone-based copolymers, methyltrichlorosilane, dimethylchlorosilane, trimethylsilyl chloride, or organic silane monomers may be used, and other materials are also possible. Vinyl acrylate/hydroxy acrylate, urethane acrylate, isocyanate acrylate, carboxylic acid acrylate, or hydroxy acrylate monomers may be used and other materials are also available. Examples of an available additive include an antistatic agent, a leveling agent, a dispersant, an antioxidant, an antifoaming agent, a lubricant, a UV-blocking agent, a UV absorbent, or a tackifying resin. A preparation method may include mixing a monomer blend and an initiator and conducting photopolymerization, solution polymerization, suspension polymerization, bulk polymerization, or emulsion polymerization. According to one exemplary embodiment, an adhesive member having a modulus of $5 \times 10^5$ pascal (Pa) or greater may be applied to area A.

According to various exemplary embodiments, adhesive C applied to area A or B may be different in physical property (modulus), which may be achieved by a method in which different kinds or compositions of monomers may be employed or adjustment may be made of the amount of an initiator, a molecular weight regulator, or a reaction temperature to control the molecular weight. Other methods may be used to control the physical property.

Figure 3C:
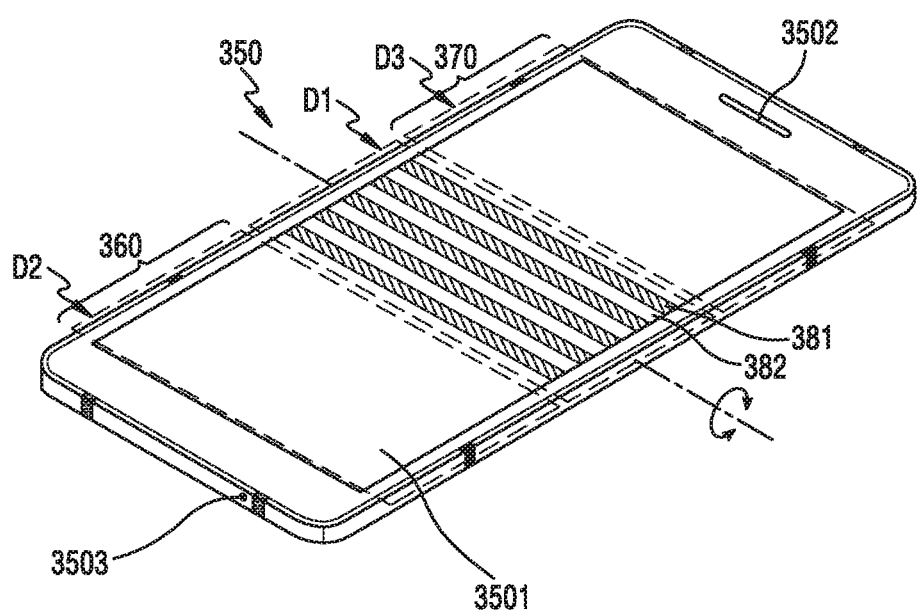
FIGS. 3C and 3D are views of a bendable type electronic device including a flexible display according to various embodiments of the present disclosure.
Figure 3D:
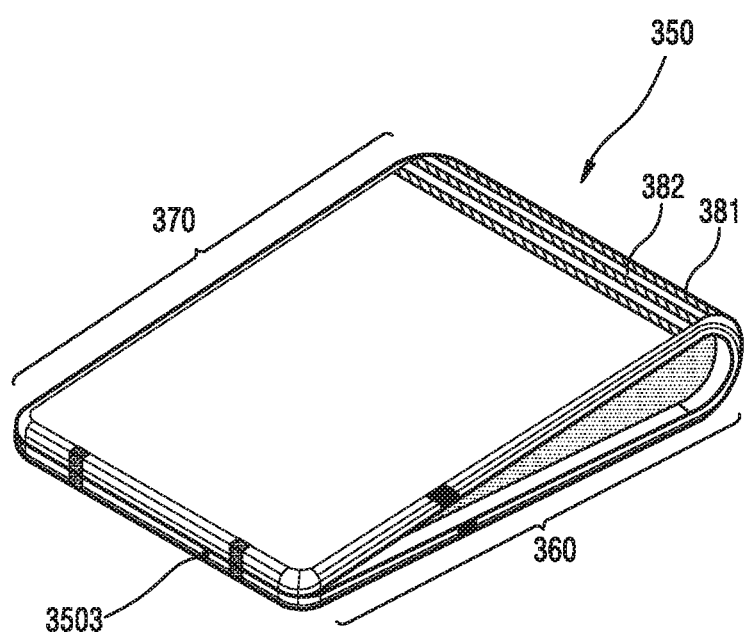

FIGS. 3C and 3D are views of a bendable type electronic device including a flexible display according to various embodiments of the present disclosure.

Referring to FIGS. 3C and 3D, an electronic device 350 may be configured to be a single body. According to an embodiment, the electronic device 350 may include a display 3501 on a front surface thereof. According to an embodiment, the electronic device may be a communication electronic device having a speaker device 3502 disposed on one side of the display 3501 and having a microphone device 3503 disposed on the other side thereof. According to an embodiment, the electronic device 350 may be mainly bent at an axis formed at a center portion thereof and may be divided into a first area 360 and a second area 370 after being bent. According to an embodiment, the first area 360 and the second area 370 may be bent so as to face each other. According to an embodiment, a flexible display 3501 may be disposed to include both the first area 360 and the second area 370. According to an embodiment, the second area 370 may be deformed in a manner of overlapping the first area 360 without any separate connecting device.

According to various embodiments, a flexible display 3501 may include area D1, which is a folding area where a deformation characteristic is exhibited, and areas D2 and D3, which are not deformed. According to an embodiment, folding area D1 may have, as described above, an adhesive member 381 having a soft type attribute and an adhesive member 382 having a hard type attribute, which are alternately arranged thereon. However, the present disclosure is not limited thereto. As described above, only the soft type adhesive member 381 may be applied to folding area D1 as well.

A method for applying adhesive members having different modulus characteristics to different areas of the same adhesive layer, and a detailed structure of a display configured thereby will be hereinafter described.

Figure 4:
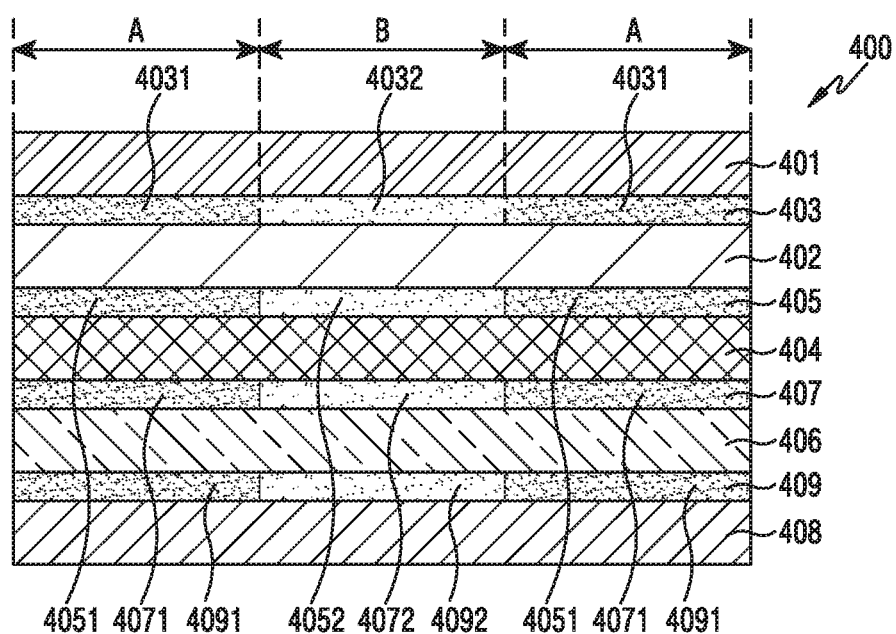
FIG. 4 is a view illustrating a structure of a display according to various embodiments of the present disclosure.

FIG. 4 is a view illustrating a structure of a display according to various embodiments of the present disclosure. A display 400 of FIG. 4 may be similar to the display 301 of FIGS. 3A and 3B or the display 3501 of FIGS. 3C and 3D or may be another embodiment of the display.

Referring to FIG. 4, the display 400 may include a first layer 401 (e.g., a window film) including a first member, a second layer 402 (e.g., a touch panel) including a second member formed under the first layer 401, and a third layer 403 disposed between the first layer 401 and the second layer 402. According to an embodiment, the third layer 403 may include a first adhesive member 4031, which is formed in a first area (area A of FIG. 4) and has a first attribute, and a second adhesive member 4032, which is formed in a second area (area B of FIG. 4) of the third layer 403 and has a second attribute. According to an embodiment, the first member of the first layer 401 may be a window film made of a transparent material and formed into the outer surface of the display 400. According to an embodiment, the first layer 401 used as a window may have areas formed to have thicknesses different from one another. According to an embodiment, when area B among areas of the window is a physically deformable area (e.g., a folding area), the thickness thereof may be formed to be thinner than that of area A. According to an embodiment, the second member of the second layer 402 may be a touch panel. According to an embodiment, the third layer 403 may be applied as an adhesive layer for coupling the first layer 401 and the second layer 402. According to an embodiment, a first attribute of the first adhesive member 4031 may be formed to be harder than a second attribute of the second adhesive member 4032. According to an embodiment, the first adhesive member 4031 may have a modulus characteristic equal to or greater than $5 \times 10^5$ pascal (Pa). According to an embodiment, the second adhesive member 4032 may have a modulus characteristic smaller than $5 \times 10^5$ pascal (Pa). According to an embodiment, the first adhesive member 4031 may be applied to the area configured not to folded (area A) of the display 301 illustrated in FIG. 3A. According to an embodiment, the second adhesive member 4032 may be applied to the folding area (area B) of the display 301 illustrated in FIG. 3A.

According to various embodiments, the display 400 may further include a fourth layer 404 (e.g., a polarizing plate), which is formed under the second layer 402 and includes a third member, and a fifth layer 406 (e.g., a flexible display), which is formed under the fourth layer 404 and includes a fourth member. According to an embodiment, the display 400 may include a sixth layer 407 between the fourth layer 404 and the fifth layer 406. According to an embodiment, the sixth layer 407 may include a third adhesive member 4071, which is formed in a third area corresponding to the first area (area A) described above and includes the first attribute of the first adhesive member 4031 described above. According to an embodiment, the display 400 may include a fourth adhesive member 4072, which is formed in a fourth area corresponding to the second area of the above described second adhesive member 4032 of the sixth layer 407 and includes the second attribute. According to an embodiment, the attribute of the first adhesive member 4031 disposed in the first area of the third layer 403 and an attribute of the third adhesive member 4071 disposed in the third area of the sixth layer 407 are similar to each other or the same. According to an embodiment, the attribute of the second adhesive member 4032 disposed in the second area of the third layer 403 and an attribute of the fourth adhesive member 4072 disposed in the fourth area of the sixth layer 407 are similar to each other or the same as well.

According to various embodiments, the third member of the fourth layer 404 may include a polarizing plate. According to an embodiment, the fourth member of the fifth layer 406 may include a flexible display panel.

According to various embodiments, the display 400 may include a seventh layer 405, which is disposed between the second layer 402 and the fourth layer 404 and includes adhesive members 4051 and 4052 having attributes of the adhesive members 4031 and 4032 similar to or the same as those of the third layer 403. According to an embodiment, the display 400 may include an eighth layer 408 (e.g., a protection film or elastic member) including a fifth member under the fifth layer 406 and may include a ninth layer 409 including adhesive members 4091 and 4092 having attributes of the adhesive members 4031 and 4032 similar to or the same as those of the third layer 403 between the fifth layer 406 and the eighth layer 408. According to an embodiment, the fifth member of the eighth layer 408 may include a protection film or an elastic member.

According to various embodiments, the display 400 may include a plurality of adhesive layers including the third layer 403, seventh layer 405, sixth layer 407, and ninth layer 409, which are adhesive layers for sequentially laminating the first layer 401, second layer 402, fourth layer 404, fifth layer 406, and eighth layer 408. According to an embodiment, the third layer 403, which is an adhesive layer disposed at a position closest to the first layer 401 configuring the outer surface of the display 400, may have adhesive members 4031 and 4032 which have different attributes and are arranged in different areas within the single adhesive layer, respectively. However, adhesive layers having the same attribute as those of the third layer 403 may not be arranged on the seventh layer 405, sixth layer 407, and ninth layer 409, which are adhesive layers arranged under the third layer.

According to various embodiments, an adhesive layer applied to the third layer 403, the seventh layer 405, the sixth layer 407, or the ninth layer 409 may have a width ranging between 50 μm and 100 μm inclusive.

According to various embodiments, the adhesive member is applied to an add-on type display having a polarizing plate interposed between a touch screen panel and a display module, yet is not limited thereto. For example, an adhesive member according to an exemplary embodiment of the present disclosure may be applied to an in-cell type display having a touch panel feature integrated in a liquid crystal pixel or an on-cell type display having a touch panel feature interposed between a color filter substrate and a polarizing plate.

Figure 5A:
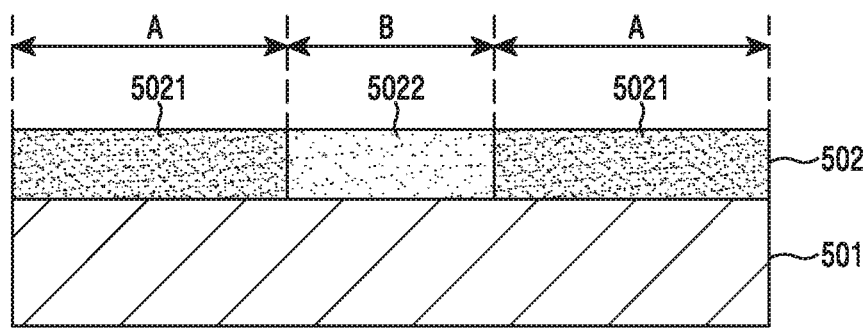
FIGS. 5A and 5B are configurational views illustrating a configuration of an adhesive layer according to various embodiments of the present disclosure.
Figure 5B:
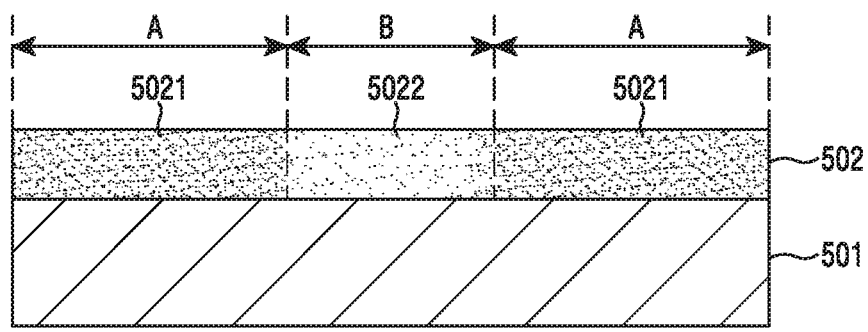

FIGS. 5A and 5B are configurational views illustrating a configuration of an adhesive layer according to various embodiments of the present disclosure. Each adhesive layer 502 of FIGS. 5A and 5B may be similar to one adhesive layer among the third layer 403, seventh layer 405, sixth layer 407, and ninth layer 409 of FIG. 4 or may be another embodiment of an adhesive layer. Each member 501 of FIGS. 5A and 5B may be similar to one layer among the first layer 401, second layer 402, fourth layer 404, fifth layer 406, and eighth layer 408 of FIG. 4 or may be another embodiment of a member.

Referring to FIGS. 5A and 5B, the adhesive layer 502 may be laminated on the upper side of the member 501. According to an embodiment, the adhesive layer 502 may include at least two areas. According to an embodiment, the member 501 may be a release film. According to an embodiment, the member 501 may be a constituent element (e.g., a window film, etc.) constituting the display. According to an embodiment, the adhesive layer 502 may include a first adhesive member 5021 which has a first attribute and is disposed in a first area (area A). According to an embodiment, the adhesive layer 502 may include a second adhesive member 5022 having a second attribute in a second area (area B). According to an embodiment, an area in which the second adhesive member 5022 is disposed may be one in which deformation of an electronic device including a flexible display is possible. According to an embodiment, an area in which the first adhesive member 5021 is disposed may include a display area, configured not to be deformed, of the electronic device. According to an embodiment, a deformable area may include a foldable display area of the electronic device. According to an embodiment, a first attribute of the first adhesive member 5021 may be configured to be harder than a second attribute of the second adhesive member 5022. According to an embodiment, the first adhesive member 5021 may have a modulus characteristic equal to or greater than $5 \times 10^5$ pascal (Pa). According to an embodiment, the second adhesive member 5022 may have a modulus characteristic smaller than $5 \times 10^5$ pascal (Pa).

According to various embodiments, in the first adhesive member 5021 and the second adhesive member 5022, as in FIG. 5A, the first adhesive member 5021 and the second adhesive member 5022, or the first area (area A) and the second area (area B) may have a clear boundary therebetween. According to an embodiment, as in FIG. 5B, the first adhesive member 5021 and the second adhesive member 5022 may not have a clear boundary therebetween. In such case, both of the adhesive members 5021 and 5022 may include a liquid type adhesive member. According to an embodiment, each of the first adhesive member 5021 and second adhesive member 5022 may have a width ranging between 50 μm and 100 μm inclusive.

Figure 6A:
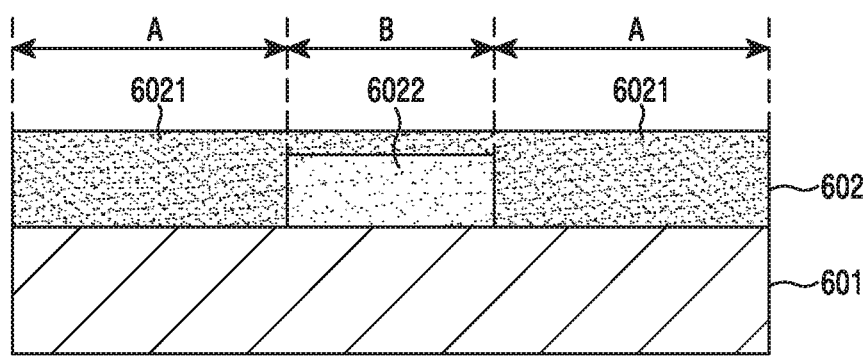
FIGS. 6A and 6B are configurational views illustrating a configuration of an adhesive layer according to various embodiments of the present disclosure.
Figure 6B:
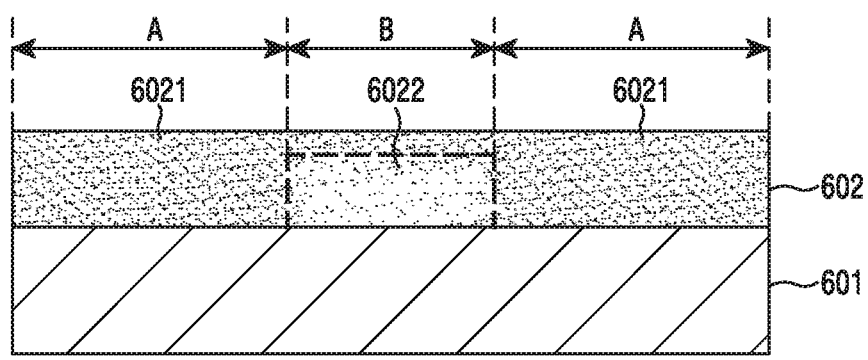

FIGS. 6A and 6B are configurational views illustrating a configuration of an adhesive layer according to various embodiments of the present disclosure. Each adhesive layer 602 of FIGS. 6A and 6B may be similar to one adhesive layer among the third layer 403, seventh layer 405, sixth layer 407, and ninth layer 409 of FIG. 4 or may be another embodiment of an adhesive layer. Each member 601 of FIGS. 6A and 6B may be similar to one layer among the first layer 401, second layer 402, fourth layer 404, fifth layer 406, and eighth layer 408 of FIG. 4 or may be another embodiment of a member.

Referring to FIGS. 6A and 6B, the adhesive layer 602 may be laminated on the upper side of the member 601. According to an embodiment, the member 601 may be a release film. According to an embodiment, the member 601 may be a constituent element (e.g., a window film, etc.) constituting the display. According to an embodiment, the adhesive layer 602 may include at least two areas. According to an embodiment, the adhesive layer 602 may include a first adhesive member 6021 which has a first attribute and is disposed in a first area (area A). According to an embodiment, the adhesive layer 602 may include a second adhesive member 6022 which has a second attribute and is disposed in a second area (area B). According to an embodiment, the first adhesive member 6021 disposed in the first area may be disposed together at least partially in an area of the second area in which the second adhesive member 6022 is disposed. According to an embodiment, the first adhesive member 6021 may be disposed to have a predetermined width at least partially on an area of an upper portion of the second area, together with the second adhesive member 6022. However, the present disclosure is not limited thereto. The first adhesive member 6021 may be disposed to have a predetermined width at least partially on an area of a lower portion of the second area.

According to various embodiments, an area in which the second adhesive member 6022 is disposed may be one in which deformation of an electronic device including a flexible display is possible. According to an embodiment, an area in which the first adhesive member 6021 is disposed may include a display area, configured not to be deformed, of the electronic device. According to an embodiment, a deformable area may include a foldable display area of the electronic device. According to an embodiment, a first attribute of the first adhesive member 6021 may be configured to be harder than a second attribute of the second adhesive member 6022. According to an embodiment, the first adhesive member 6021 may have a modulus characteristic equal to or greater than $5\times10^5$ pascal (Pa). According to an embodiment, the second adhesive member 6020 may have a modulus characteristic smaller than $5\times10^5$ pascal (Pa).

Figure 7A:
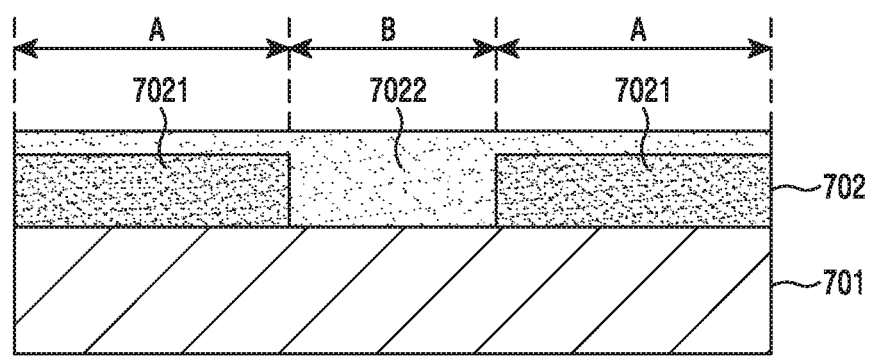
FIGS. 7A, 7B, and 7C are configurational views illustrating configurations of an adhesive layer according to various embodiments of the present disclosure.
Figure 7B:
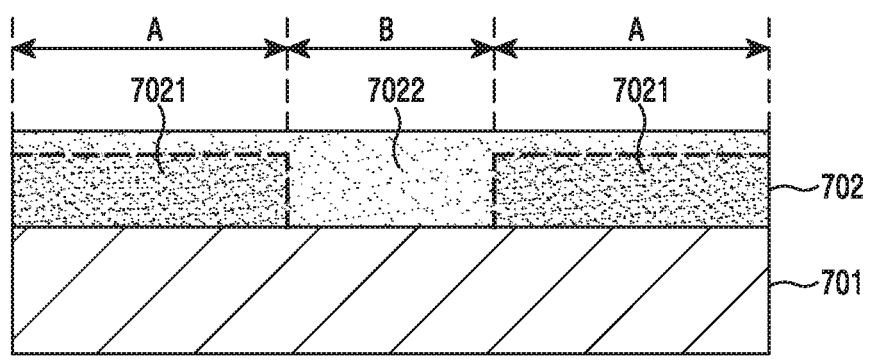
Figure 7C:
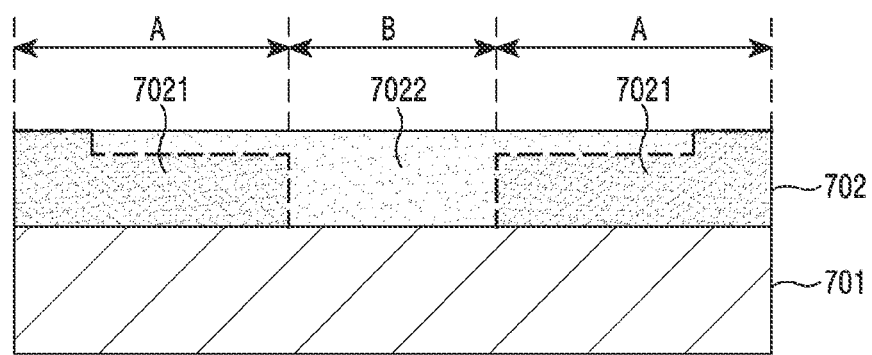

According to various embodiments, in the first adhesive member 6021 and the second adhesive member 6022, as in FIG. 6A, the first area (area A) and the second area (area B) may be clearly separated from each other. According to an embodiment, as in FIG. 6B, the first adhesive member 6021 and the second adhesive member 6022 may not have a clear boundary therebetween. In such case, both of the adhesive members 6021 and 6022 may include a liquid type adhesive member. According to an embodiment, each of the first adhesive member 6021 and second adhesive member 6022 may have a width ranging between 50 µm and 100 µm inclusive. FIGS. 7A, 7B, and 7C are configurational views illustrating configurations of an adhesive layer according to various embodiments of the present disclosure. Each adhesive layer 702 of FIGS. 7A and 7B may be similar to one adhesive layer among the third layer 403, seventh layer 405, sixth layer 407, and ninth layer 409 of FIG. 4 or may be another embodiment of an adhesive layer. Each member 701 of FIGS. 7A, 7B, and 7C may be similar to one layer among the first layer 401, second layer 402, fourth layer 404, fifth layer 406, and eighth layer 408 of FIG. 4 or may be another embodiment of a member.

Referring to FIGS. 7A, 7B, and 7C, the adhesive layer 702 may be laminated on the member 701. According to an embodiment, the member 701 may be a release film. According to an embodiment, the member 701 may be a constituent element (e.g., a window film, etc.) constituting the display. According to an embodiment, the adhesive layer 702 may include at least two areas. According to an embodiment, the adhesive layer 702 may include a first adhesive member 7021 which has a first attribute and is disposed in a first area (area A). According to an embodiment, the adhesive layer 702 may include a second adhesive member 7022 which has a second attribute and is disposed in a second area (area B). According to an embodiment, the second adhesive member 7022 disposed in the second area may be disposed together at least partially in an area of the first area in which the first adhesive member 7021 is disposed. According to an embodiment, the second adhesive member 7022 may be disposed to have a predetermined width at least partially on an area of an upper portion of the first area, together with the first adhesive member 7021, e.g., as illustrated in FIG. 7C. However, the present disclosure is not limited thereto. The second adhesive member 7022 may be disposed to have a predetermined width at least partially on an area of a lower portion of the first area.

According to various embodiments, an area in which the second adhesive member 7022 is disposed may be one in which deformation of an electronic device including a flexible display is possible. According to an embodiment, an area in which the first adhesive member 7021 is disposed may include a display area, configured not to be deformed, of the electronic device. According to an embodiment, a deformable area may include a foldable display area of the electronic device. According to an embodiment, a first attribute of the first adhesive member 7021 may be configured to be harder than a second attribute of the second adhesive member 7022. According to an embodiment, the first adhesive member 7021 may have a modulus characteristic equal to or greater than $5\times10^5$ pascal (Pa). According to an embodiment, the second adhesive member 7022 may have a modulus characteristic smaller than $5\times10^5$ pascal (Pa).

According to various embodiments, in the first adhesive member 7021 and the second adhesive member 7022, as in FIG. 7A, the first area (area A) and the second area (area B) may be clearly separated from each other. According to an embodiment, as in FIG. 7B, the first adhesive member 7021 and the second adhesive member 7022 may not have a clear boundary therebetween. In such case, both of the adhesive members 7021 and 7022 may include a liquid type adhesive member. According to an embodiment, each of the first adhesive member 7021 and second adhesive member 7022 may have a width ranging between 50 µm and 100 µm inclusive.

Figure 8:
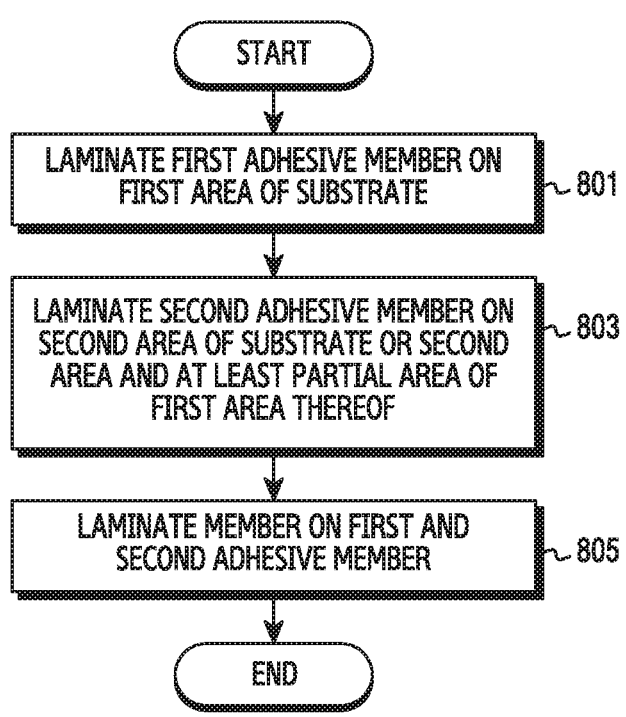
FIG. 8 is a process chart illustrating a manufacturing process of an adhesive layer according to various embodiments of the present disclosure.

FIG. 8 is a process chart illustrating a manufacturing process of an adhesive layer according to various embodiments of the present disclosure. According to an embodiment, before 801 operation of applying an adhesive member, a member (e.g., the first layer 401, second layer 402, fourth layer 404, fifth layer 406, or eighth layer 408 of FIG. 4) may be prepared. According to an embodiment, the member (e.g., the first layer 401, second layer 402, fourth layer 404, fifth layer 406, or eighth layer 408 of FIG. 4) may be a release film used as in an operation, in which an adhesive member to be described below is applied to a corresponding member of a display, and the member is then stripped off. According to an embodiment, the member may be a display constituent element (e.g., a window film) directly applied to the display.

According to various embodiments, in operation 801, a first adhesive member (e.g., 4031, 4051, 4071, or 4091 of FIG. 4) may be laminated on an application surface of the member (e.g., the first layer 401, second layer 402, fourth layer 404, fifth layer 406, or eighth layer 408 of FIG. 4). According to an embodiment, the first adhesive member (e.g., 4031, 4051, 4071, or 4091 of FIG. 4) may be applied to a first area (e.g., area A of FIG. 4) of the member. According to an embodiment, the first adhesive member (e.g., 4031, 4051, 4071, or 4091 of FIG. 4) may be applied to an area, configured not to be deformed, of a deformable display of an electronic device. According to an embodiment, the first adhesive member (e.g., 4031, 4051, 4071, or 4091 of FIG. 4) may be applied to the first area (e.g., area A of FIG. 4) of the member by an adhesive member applying device through at least one process selected from a coating, a spin coating, a squeegee, a drop, and a dispensing process, and a laminating process.

According to various embodiments, in operation 803, a second adhesive member (e.g., 4032, 4052, 4072, or 4092 of FIG. 4) may be laminated on an application surface of the member (e.g., the first layer 401, second layer 402, fourth layer 404, fifth layer 406, or eighth layer 408 of FIG. 4). According to an embodiment, the second adhesive member (e.g., 4032, 4052, 4072, or 4092 of FIG. 4) may be applied to a second area (e.g., area B of FIG. 4) separated from the first area (e.g., area A of FIG. 4) of the member. However, the present disclosure is not limited thereto. The second adhesive member (e.g., 4032, 4052, 4072, or 4092 of FIG. 4) may be applied at least partially to an area of the first area (e.g., area A of FIG. 4), together with the first adhesive member (e.g., 4031, 4051, 4071, or 4091 of FIG. 4). According to an embodiment, the second adhesive member (e.g., 4032, 4052, 4072, or 4092 of FIG. 4) may be applied to an area, configured to be deformed, of a deformable display of an electronic device. According to an embodiment, an adhesive layer may be implemented in a roll to roll scheme or a chip scheme depending on a member to be applied thereto or a manufacturing method. According to an embodiment, the first adhesive member (e.g., 4031, 4051, 4071, or 4091 of FIG. 4) may be applied to the first area (e.g., area A of FIG. 4) of the member by the adhesive member applying device through at least one process selected from a coating, a spin coating, a squeegee, a drop, and a dispensing process, and a laminating process. According to an embodiment, a coating, a squeegee, a drop, or a dispensing process may be implemented in a roll to roll scheme or a chip scheme. According to an embodiment, a spin coating process may be implemented in a chip scheme.

According to various embodiments, in operation 805, a member may be laminated on an adhesive layer including the first and the second adhesive member laminated on another member (e.g., the first layer 401, second layer 402, fourth layer 404, fifth layer 406, or eighth layer 408 of FIG. 4). According to an embodiment, the member (e.g., the first layer 401, second layer 402, fourth layer 404, fifth layer 406, or eighth layer 408 of FIG. 4) may be used as a constituent element of the display and applied to at least one member (e.g., the first layer 401, second layer 402, fourth layer 404, fifth layer 406, or eighth layer 408 of FIG. 4) using an adhesive layer. According to an embodiment, the member (e.g., the first layer 401, second layer 402, fourth layer 404, fifth layer 406, or eighth layer 408 of FIG. 4) may include a window film, a touch panel, a polarizing plate, a flexible display, or a protection film. According to an embodiment, the member may include a pressure sensor layer or a transparent antenna layer.

According to various embodiments, 801 operation and 803 operation may be switched in a process order thereof. According to an embodiment, such cases may include a case in which the first adhesive member (e.g., 4031, 4051, 4071, or 4091 of FIG. 4) is applied together at least partially to an upper portion of an area where the second adhesive member (e.g., 4032, 4052, 4072, or 4092 of FIG. 4) is disposed.

An adhesive layer manufacturing method will be hereinafter described in detail.

Figure 9A:
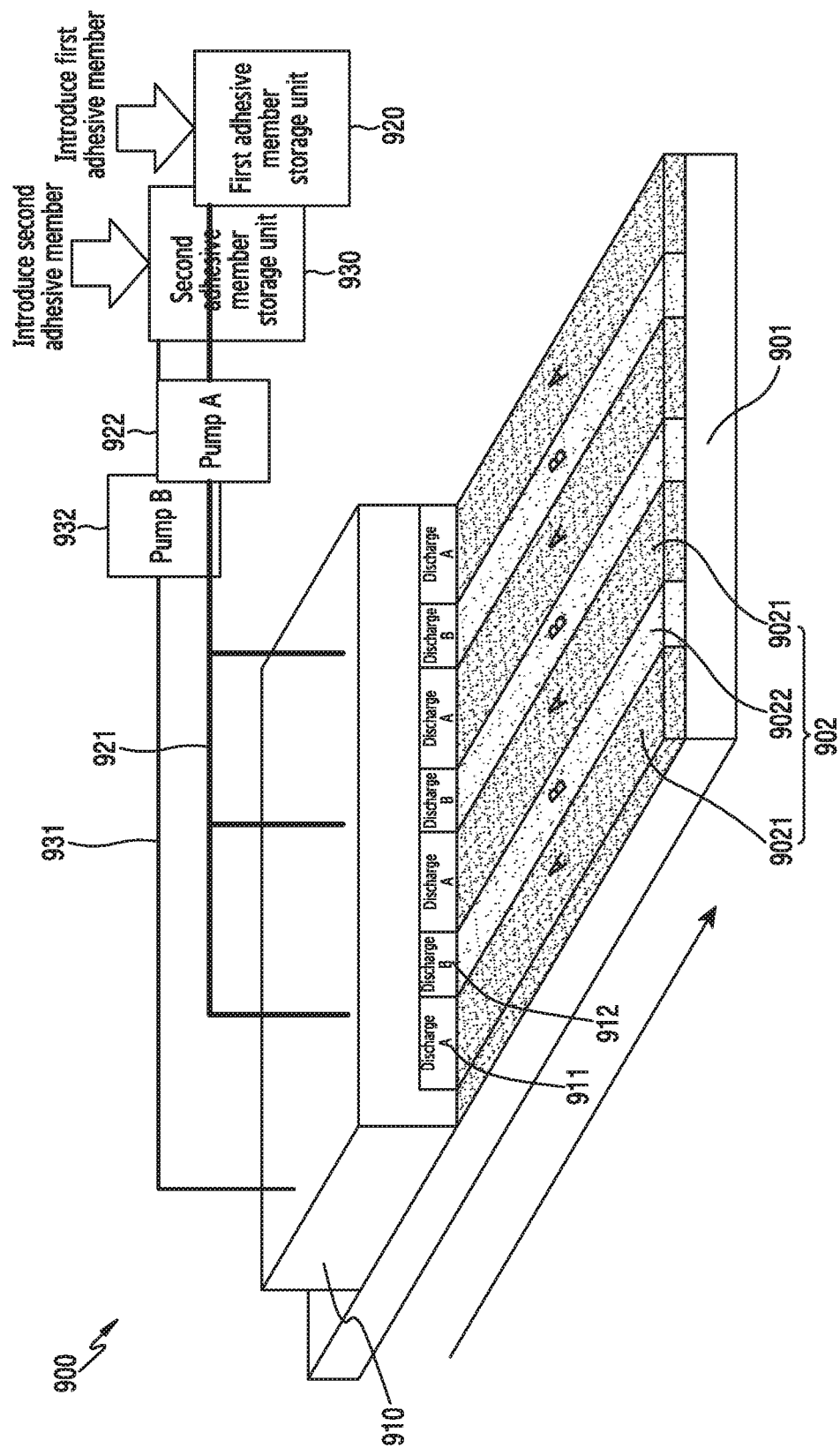
FIG. 9A is a configurational view of an adhesive member applying device according to various embodiments of the present disclosure.

FIG. 9A is a configurational view of an adhesive member applying device according to various embodiments of the present disclosure.

Referring to FIG. 9A, an adhesive member applying device 900 may form an adhesive layer 902 on a member 901 (e.g., the first layer 401, second layer 402, fourth layer 404, fifth layer 406, or eighth layer 408 of FIG. 4), by simultaneously applying a first adhesive member 9021 and a second adhesive member 9022. According to an embodiment, the adhesive member applying device 900 may include a head 910 having a plurality of discharge ports 911 and 912 for simultaneously discharging the adhesive members 9021 and 9022. According to an embodiment, the head 910 may have first adhesive member discharge ports 911 (discharge A) and second adhesive member discharge ports 912 (discharge B), which are arranged alternately. According to an embodiment, at least one first adhesive member discharge port 911 may be connected to a first adhesive member storage unit 920 through a transfer tube 921 to receive the first adhesive member 9021 provided thereto. According to an embodiment, at least one second adhesive member discharge port 912 may be connected to a second adhesive member storage unit 930 through a transfer tube 931 to receive the second adhesive member 9022 provided thereto. According to an embodiment, supply pumps 922 and 932 are further interposed within the transfer tubes 921 and 931, respectively, and may actuate the adhesive members 9021 and 9022 having viscosity to be easily discharged from the discharge ports 911 and 912, respectively.

According to various embodiments, the member (e.g., a release film, a window film, etc.) 901 (e.g., the first layer 401, second layer 402, fourth layer 404, fifth layer 406, or eighth layer 408 of FIG. 4) may be transferred in the arrow direction in FIG. 9A via the head 910, and in the meantime, may receive the adhesive members 9021 and 9022 from the plurality of discharge ports 911 and 912 of the head 910. According to an embodiment, the head 910 may include a head optimized for a coating, a spin coating, a squeegee, a drop, or a dispensing process.

Figure 9B:
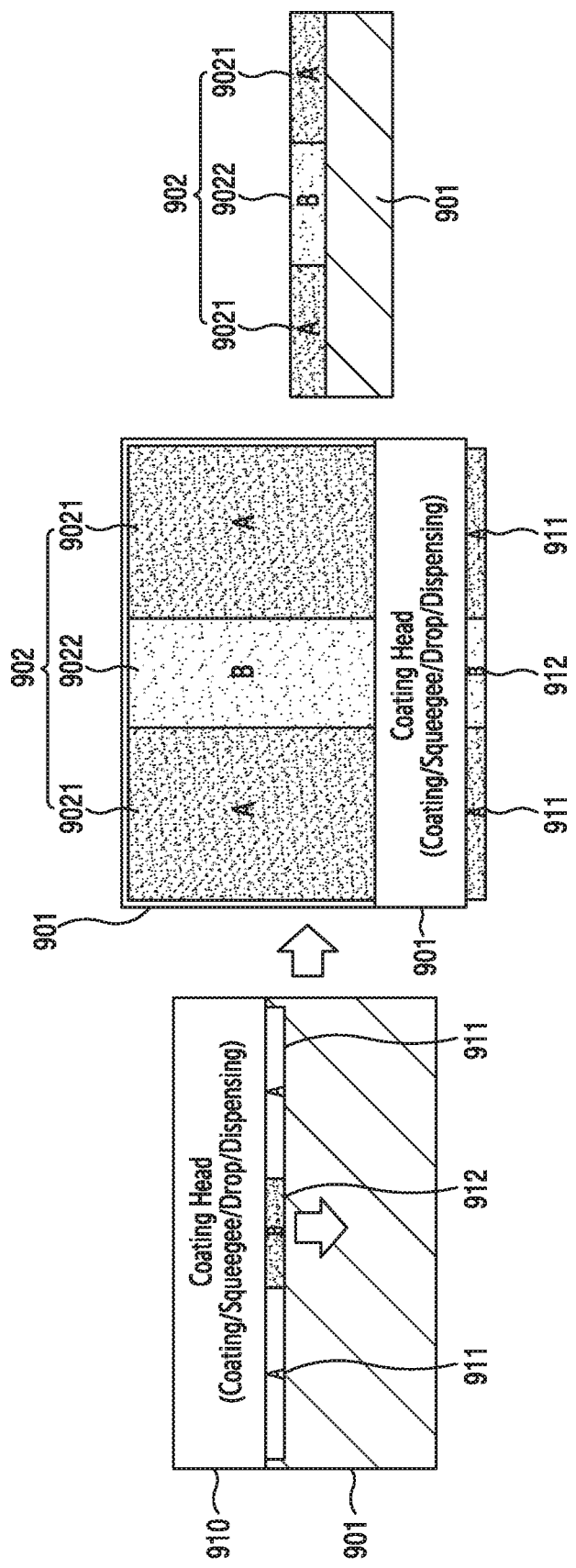
FIGS. 9B and 9C are views illustrating an adhesive layer forming process by the adhesive member applying device of FIG. 9A according to various embodiments of the present disclosure.
Figure 9C:
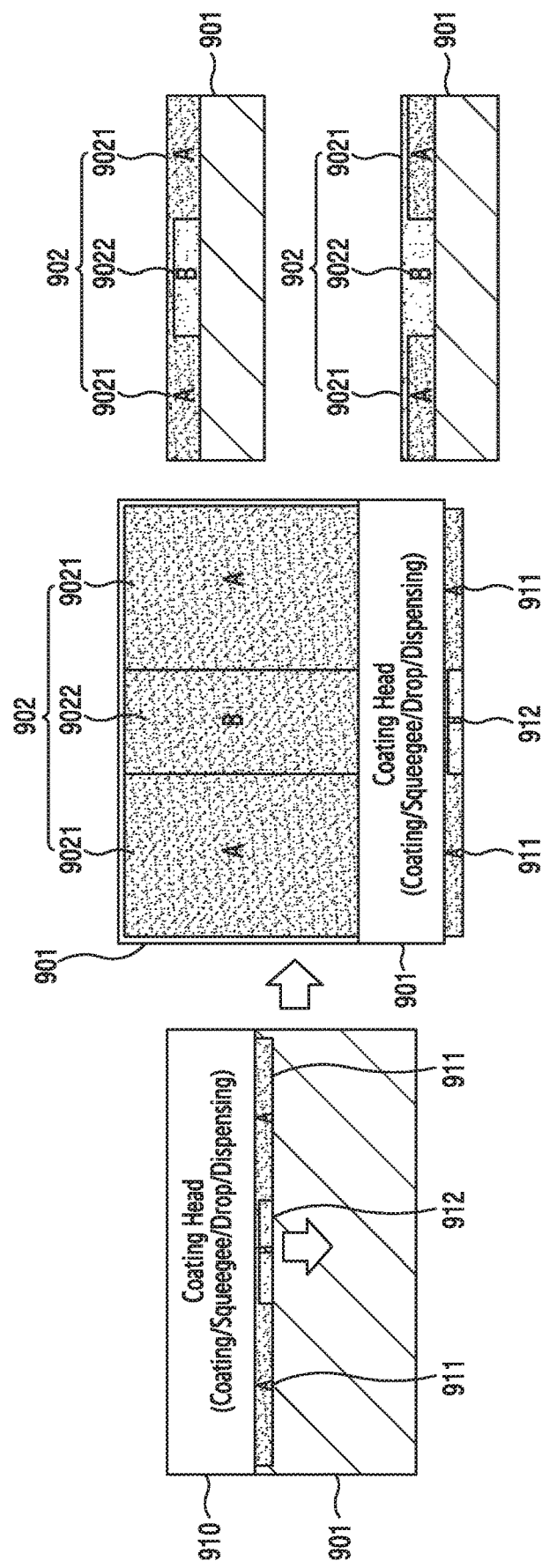

FIGS. 9B and 9C are views illustrating an adhesive layer forming process by the adhesive member applying device of FIG. 9A according to various embodiments of the present disclosure.

Referring to FIG. 9B, when a member 901 (e.g., the first layer 401, second layer 402, fourth layer 404, fifth layer 406, or eighth layer 408 of FIG. 4) is transferred through the bottom portion of a head 910 of an adhesive member providing device, adhesive members 9021 and 9022 may be applied to a contact surface of the member 901 with the head 910. According to an embodiment, the first adhesive member 9021 may be applied to a first area (area A) of the member 901 through the first adhesive member discharge port 911. According to an embodiment, the second adhesive member 9022 may be applied to a second area (area B) of the member 901 through the second adhesive member discharge port 912.

According to various embodiments, an adhesive layer 902 may be formed on the member 901 (e.g., the first layer 401, second layer 402, fourth layer 404, fifth layer 406, or eighth layer 408 of FIG. 4) having passed through the head 910. According to an embodiment, the adhesive layer 902 may include the first adhesive member 9021 disposed in the first area (area A) and the second adhesive member 9022 disposed in the second area (area B). According to an embodiment, a first attribute of the first adhesive member 9021 may be configured to be harder than a second attribute of the second adhesive member 9022. According to an embodiment, the first adhesive member 9021 may have a modulus characteristic equal to or greater than $5 \times 10^5$ pascal (Pa). According to an embodiment, the second adhesive member 9022 may have a modulus characteristic smaller than $5\times10^5$ pascal (Pa). According to an embodiment, the first area (area A) of the member 901 where the first adhesive member 9021 is disposed may include a display area, configured not to be deformed, of an electronic device. According to an embodiment, the second area (area B) of the member 901 where the second adhesive member 9022 is disposed may include a foldable display area of the electronic device.

According to various embodiments, an adhesive layer 502 as in FIGS. 5A and 5B may be formed by using the adhesive member applying device 900 of FIG. 9A and through the process of FIG. 9B.

Referring to FIG. 9C, when a member 901 (e.g., the first layer 401, second layer 402, fourth layer 404, fifth layer 406, or eighth layer 408 of FIG. 4) is transferred through the bottom portion of a head 910 of an adhesive member providing device, adhesive members 9021 and 9022 may be applied to a contact surface of the member 901 with the head 910. According to an embodiment, the first adhesive member 9021 may be applied to a first area (area A) of the member 901 through the first adhesive member discharge port 911. According to an embodiment, the second adhesive member 9022 may be applied to a second area (area B) of the member 901 through the second adhesive member discharge port 912. According to an embodiment, the first adhesive member discharge port 911 may be disposed on the head 910 to include the second adhesive member discharge port 912.

According to various embodiments, an adhesive layer 902 may be formed on the member 901 (e.g., the first layer 401, second layer 402, fourth layer 404, fifth layer 406, or eighth layer 408 of FIG. 4) having passed through the head 910. According to an embodiment, the adhesive layer 902 may include the first adhesive member 9021 disposed in the first area (area A) and the second adhesive member 9022 disposed in the second area (area B). According to an embodiment, the first adhesive member 9021 may be applied, together with the second adhesive member 9022, to the upper side of the second area. However, the present disclosure is not limited thereto. When the second adhesive member discharge port 912 is disposed to include the first adhesive member discharge port 911, the second adhesive member 9022 may be applied, together with the first adhesive member 9021, to the upper side of the first area (area A). According to an embodiment, a first attribute of the first adhesive member 9021 may be configured to be harder than a second attribute of the second adhesive member 9022. According to an embodiment, the first adhesive member 9021 may have a modulus characteristic equal to or greater than $5\times10^5$ pascal (Pa). According to an embodiment, the second adhesive member 9022 may have a modulus characteristic smaller than $5\times10^5$ pascal (Pa). According to an embodiment, the first area (area A) of the member 901 where the first adhesive member 9021 is disposed may include a display area, configured not to be deformed, of an electronic device. According to an embodiment, the second area (area B) of the member 901 where the second adhesive member 9022 is disposed may include a foldable display area of the electronic device.

According to various embodiments, adhesive layers 602 and 702 as in FIGS. 6A to 7B may be formed by using the adhesive member applying device 900 of FIG. 9A and through the process of FIG. 9C.

Figure 10A:
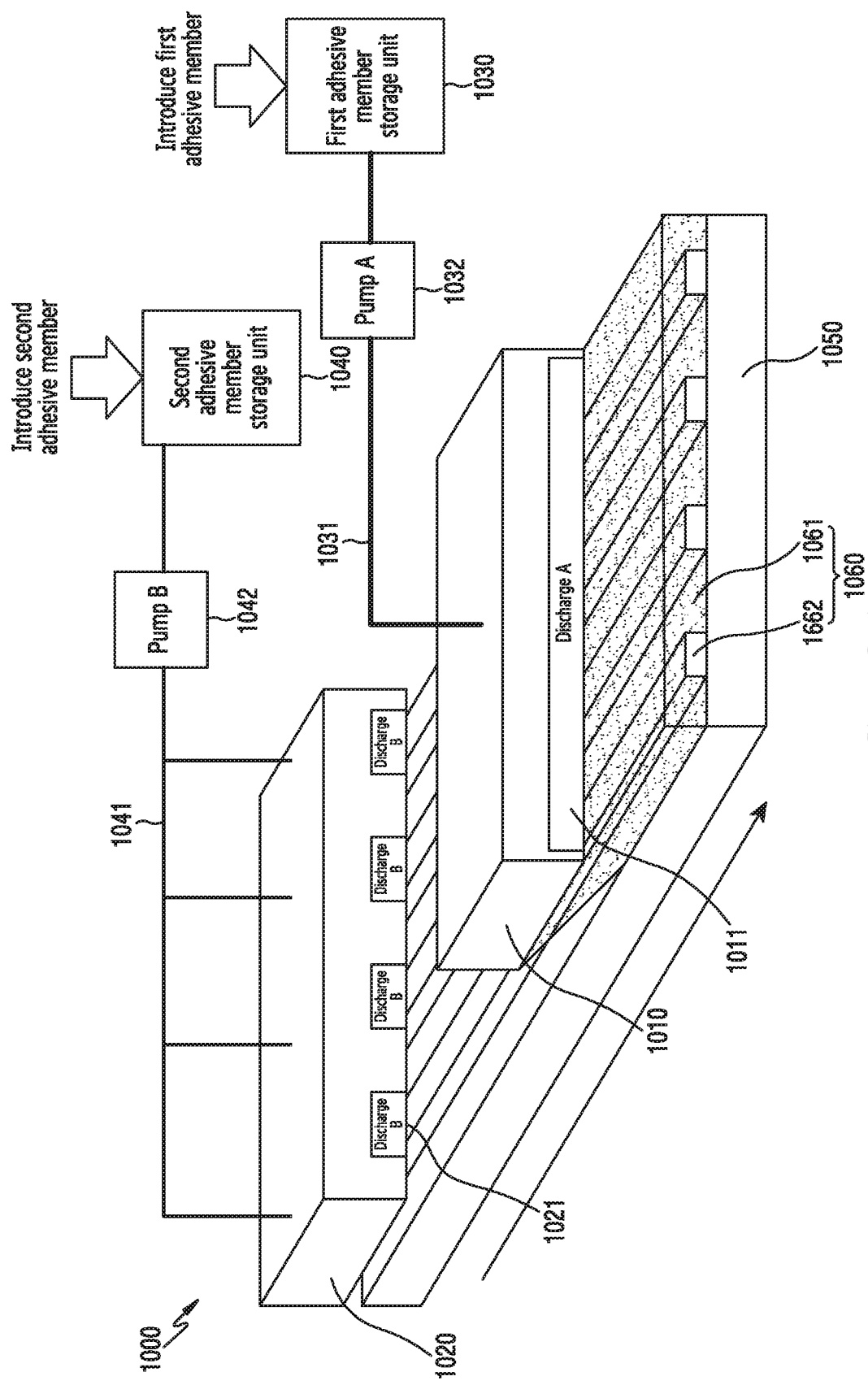
FIG. 10A is a configurational view of an adhesive member applying device according to various embodiments of the present disclosure.

FIG. 10A is a configurational view of an adhesive member applying device according to various embodiments of the present disclosure. An adhesive member applying device of FIG. 10A illustrates a state in which a pair of heads for applying adhesive members having attributes different from each other are separately arranged in positions different from each other.

Referring to FIG. 10A, an adhesive member applying device 1000 may form an adhesive layer 1060 on a member 1050 (e.g., the first layer 401, second layer 402, fourth layer 404, fifth layer 406, or eighth layer 408 of FIG. 4), by applying a first adhesive member 1061 and a second adhesive member 1062, with temporal differences therebetween. According to an embodiment, the adhesive member applying device 1000 may include a first head 1010 having a discharge port (discharge A) 1011 for discharging the first adhesive member 1061. According to an embodiment, the adhesive member applying device 1000 may include a second head 1020 having one or more discharge ports (discharge B) 1021 for discharging the second adhesive member 1062. According to an embodiment, the second head 1020 may be disposed in a position in which, when a member 1050 is transferred in the illustrated arrow direction, the second head 1020 can apply the second adhesive member 1062 to the upper surface of the member 1050 in advance.

According to various embodiments, the first adhesive member discharge port 1011 may be disposed to have sufficient size to cover an area of all the multiple discharge ports 1021 of the second head 1020. According to an embodiment, the first adhesive member discharge port 1011 may be connected to a first adhesive member storage unit 1030 through a transfer tube 1031 to receive the first adhesive member 1061 provided thereto. According to an embodiment, at least one second adhesive member discharge port 1021 may be connected to a second adhesive member storage unit 1040 through a transfer tube 1041 to receive the second adhesive member 1062 provided thereto. According to an embodiment, supply pumps 1031 and 1042 are further interposed within the transfer tubes 1031 and 1041, respectively, and thus the adhesive members 1061 and 1062 having viscosity may be easily provided to the corresponding discharge ports 1011 and 1021, respectively.

According to various embodiments, the member 1050 (e.g., the first layer 401, second layer 402, fourth layer 404, fifth layer 406, or eighth layer 408 of FIG. 4) (e.g., a release film, a window film, etc.) may be transferred in the arrow direction in FIG. 10A via the second head 1020 and the first head 1010, and in the meantime, may receive the adhesive members 1062 and 1061 from the corresponding discharge ports 1021 and 1011 of the heads 1020 and 1010, respectively. According to an embodiment, the heads 1010 and 1020 may include a head optimized for coating, spin coating, squeegeeing, dropping, or dispensing.

Figure 10B:
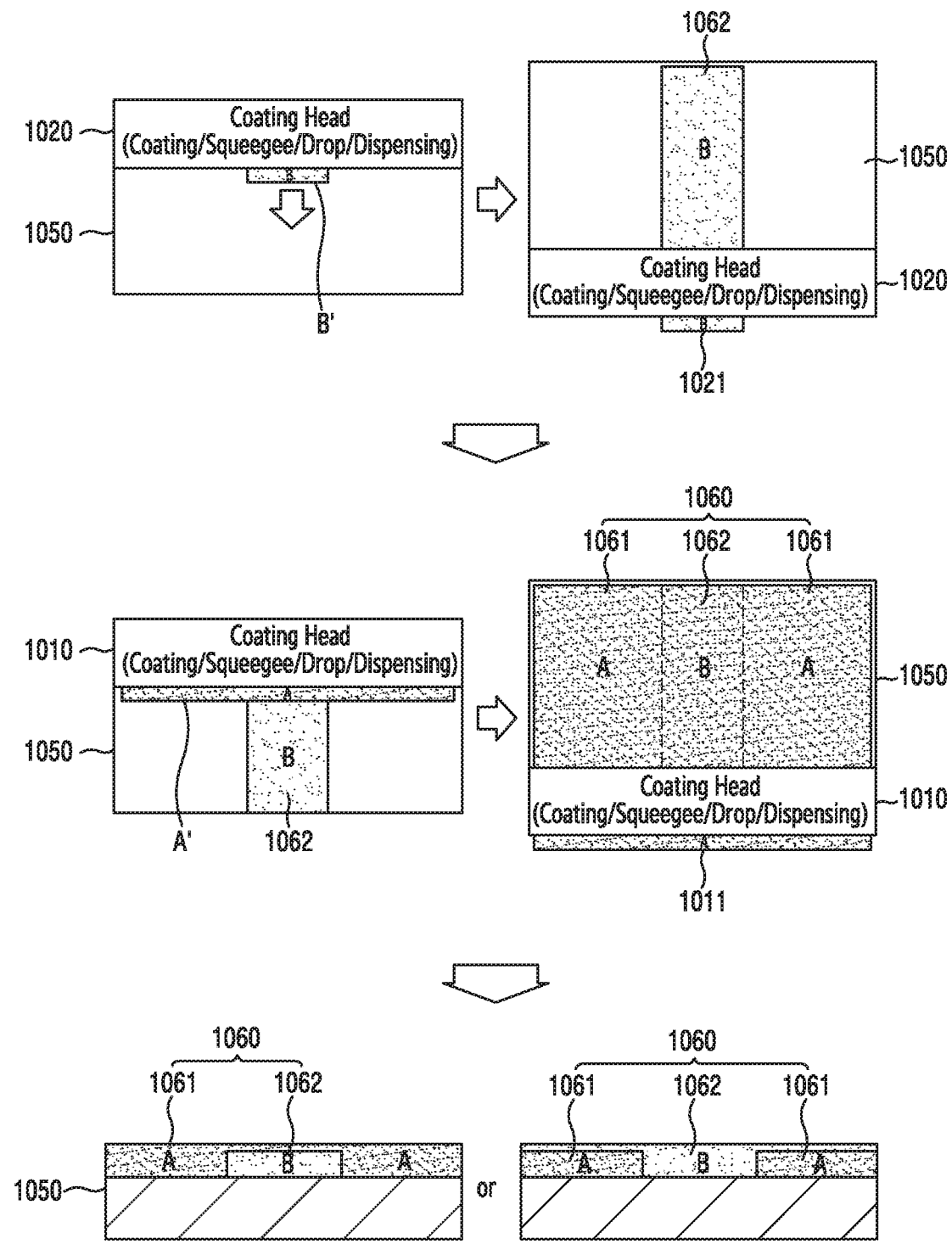
FIG. 10B is a view illustrating an adhesive layer forming process by the adhesive member applying device of FIG. 10A according to various embodiments of the present disclosure.

FIG. 10B is a view illustrating an adhesive layer forming process by the adhesive member applying device of FIG. 10A according to various embodiments of the present disclosure.

Referring to FIG. 10B, when a member 1050 is transferred through the bottom portion of a second head 1020 of an adhesive member providing device, the second adhesive member 1062 may be applied through a second adhesive member discharge port (B') to a surface, corresponding to the second head 1020, of the member 1050 (e.g., the first layer 401, second layer 402, fourth layer 404, fifth layer 406, or eighth layer 408 of FIG. 4). After the member 1050 is further transferred, a first adhesive member 1061 may be applied through the first adhesive member discharge port (A') to a contact surface of the member 1050 with the first head 1010. According to an embodiment, the second adhesive member 1062 may be applied to a second area (area B)

of the member 1050. According to an embodiment, the first adhesive member 1061 may be applied to both of the upper sides of a first area (area A) and second area (area B) of the member 1050 through the first adhesive member discharge port (A').

According to various embodiments, an adhesive layer 1060 may be formed on the upper side of the member 1050 having passed through the second head 1020 and the first head 1010. According to an embodiment, the adhesive layer 1060 may include the second adhesive member 1062 disposed in the second area (area B) of the member 1050, and the first adhesive member 1061 disposed in both the first area (area A) and the second area (area B) of the member 1050. According to an embodiment, a first attribute of the first adhesive member 1061 disposed in the first area (area A) may be configured to be harder than a second attribute of the second adhesive member 1062 disposed in the second area (area B). According to an embodiment, the first adhesive member 1061 may have a modulus characteristic equal to or greater than $5 \times 10^5$ pascal (Pa). According to an embodiment, the second adhesive member 1062 may have a modulus characteristic smaller than $5 \times 10^5$ pascal (Pa).

According to various embodiments, the first area (area A) of the member 1050 where the first adhesive member 1061 is disposed may include a display area, configured not to be deformed, of an electronic device. According to an embodiment, the second area (area B) of the member 1050 where the second adhesive member 1062 is disposed may include a foldable display area of the electronic device.

Various embodiments may be implemented by switching the position of the first head 1010 and the position of the second head 1020 to allow the second adhesive member 1062 to be applied even to the upper side of the first adhesive member 1061, which has been applied to the first area. According to an embodiment, respective discharge ports 1011 and 1021 of the first head 1010 and the second head 1020 may be arranged to be in alternating positions such that only the first adhesive member 1061 may be applied to the first area (area A) of the member 1050, and only the second adhesive member 1062 may be applied to the second area (area B) of the member 1050.

According to various embodiments, adhesive layers 602 and 702 as in FIGS. 6A to 7B may be formed by using the adhesive member applying device 1000 of FIG. 10A and through the process of FIG. 10B.

Figure 11A:
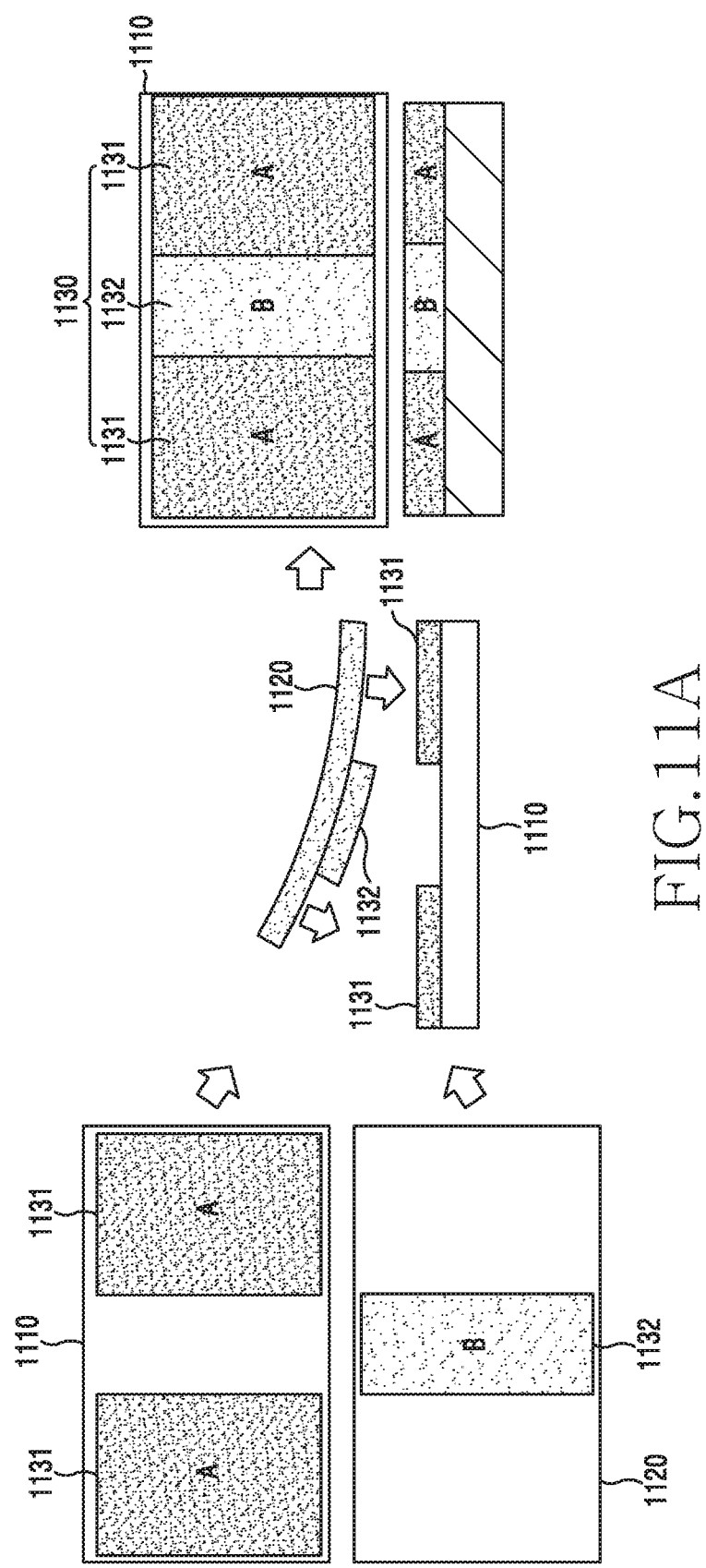
FIGS. 11A and 11B are views illustrating processes of forming an adhesive layer through a laminating technique according to various embodiments of the present disclosure.
Figure 11B:
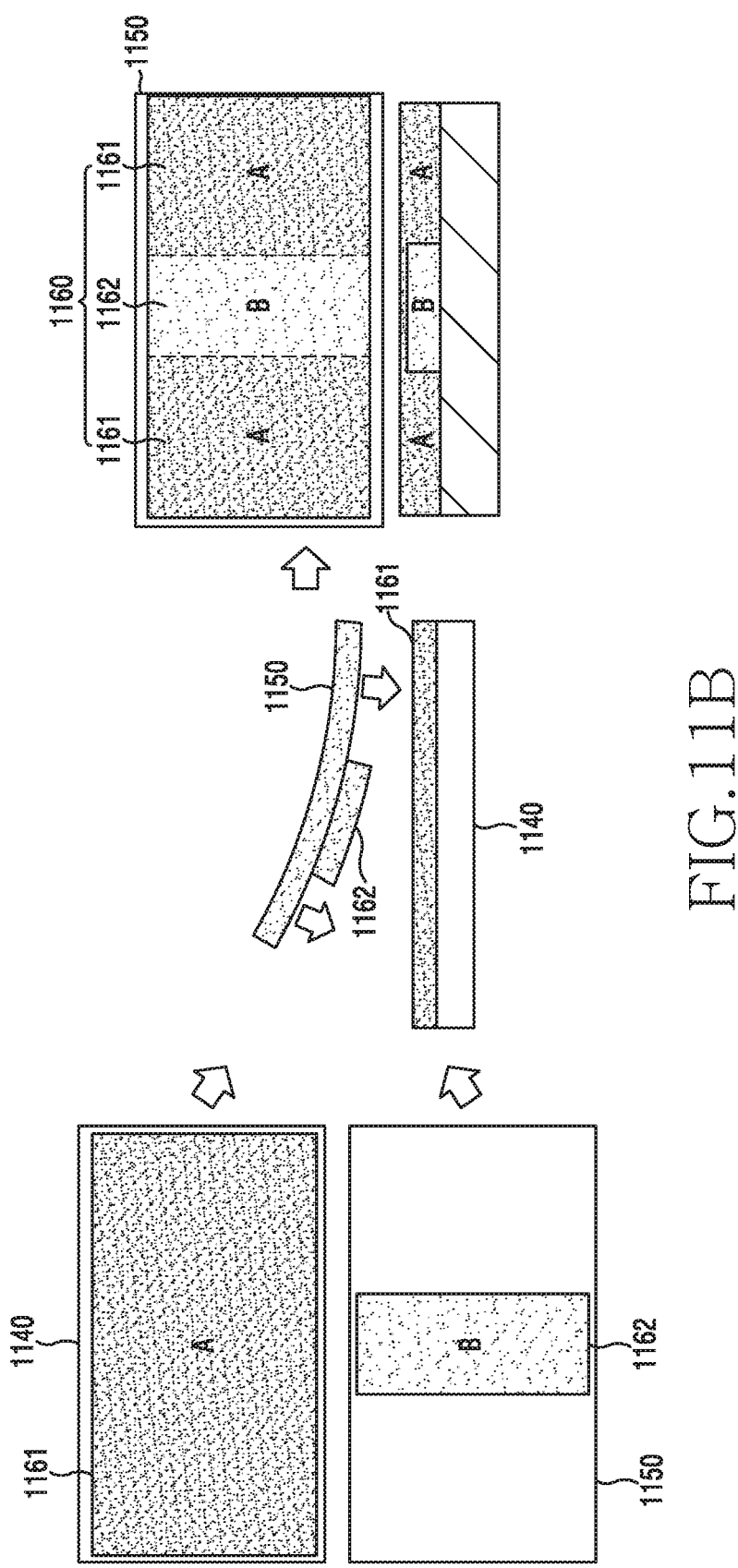

FIGS. 11A and 11B are views illustrating processes of forming an adhesive layer through a laminating technique according to various embodiments of the present disclosure.

Referring to FIG. 11A, a first adhesive member 1131 (e.g., the first layer 401, second layer 402, fourth layer 404, fifth layer 406, or eighth layer 408 of FIG. 4) may be attached to a first area (area A) of a first member 1110. According to an embodiment, a second adhesive member 1132 (e.g., the first layer 401, second layer 402, fourth layer 404, fifth layer 406, or eighth layer 408 of FIG. 4) may be attached to a second area (area B) of a second member 1120. According to an embodiment, the first area and the second area may not be areas overlapping each other. According to an embodiment, at least one of the first member 1110 and the second member 1120 may be a constituent element (e.g., a window film, a touch panel, or a polarizing plate, etc.) of the display. According to an embodiment, when the first member 1110 and the second member 1120 are joined, and the first member 1110 is then removed, the first adhesive member 1131 may be laminated on the second area on the second member 1120. In such case, the first member 1131 may include a release film removable after a laminating process.

According to an embodiment, an adhesive layer 1130 formed through the manufacturing process described above may include the first adhesive member 1131 disposed in an area corresponding to the first area (area A) of the upper surface of the second member 1120, and the second adhesive member 1132 disposed in the second area (area B) of the upper surface of the second member 1120.

According to various embodiments, an adhesive layer 502 as in FIG. 5A may be formed through the process of FIG. 11A.

Referring to FIG. 11B, a first adhesive member 1161 (e.g., the first layer 401, second layer 402, fourth layer 404, fifth layer 406, or eighth layer 408 of FIG. 4) may be attached to a first area (area A) of a first member 1140. According to an embodiment, a second adhesive member 1162 (e.g., the first layer 401, second layer 402, fourth layer 404, fifth layer 406, or eighth layer 408 of FIG. 4) may be attached to a second area (area B) of a second member 1150. According to an embodiment, the second area (area B) may be disposed in a position included in the first area (area A). According to an embodiment, at least one of the first member 1140 and the second member 1150 may be a constituent element (e.g., a window film, a touch panel, or a polarizing plate, etc.) of the display. According to an embodiment, when the first member 1140 and the second member 1150 are joined, and the first member 1140 is then removed, the first adhesive member 1161 may be laminated on the second area on the second member 1150. In such case, the first member 1140 may include a release film removable after a laminating process. According to an embodiment, an adhesive layer 1160 formed through the manufacturing process described above may include the second adhesive member 1162 disposed in the second area (area B) of the upper surface of the second member 1150, and the first adhesive member 1161 disposed in the first area (area A) including the second area (area B).

According to various embodiments, an adhesive layer 602 as in FIG. 6A may be formed through the process of FIG. 11B.

Figure 12A:
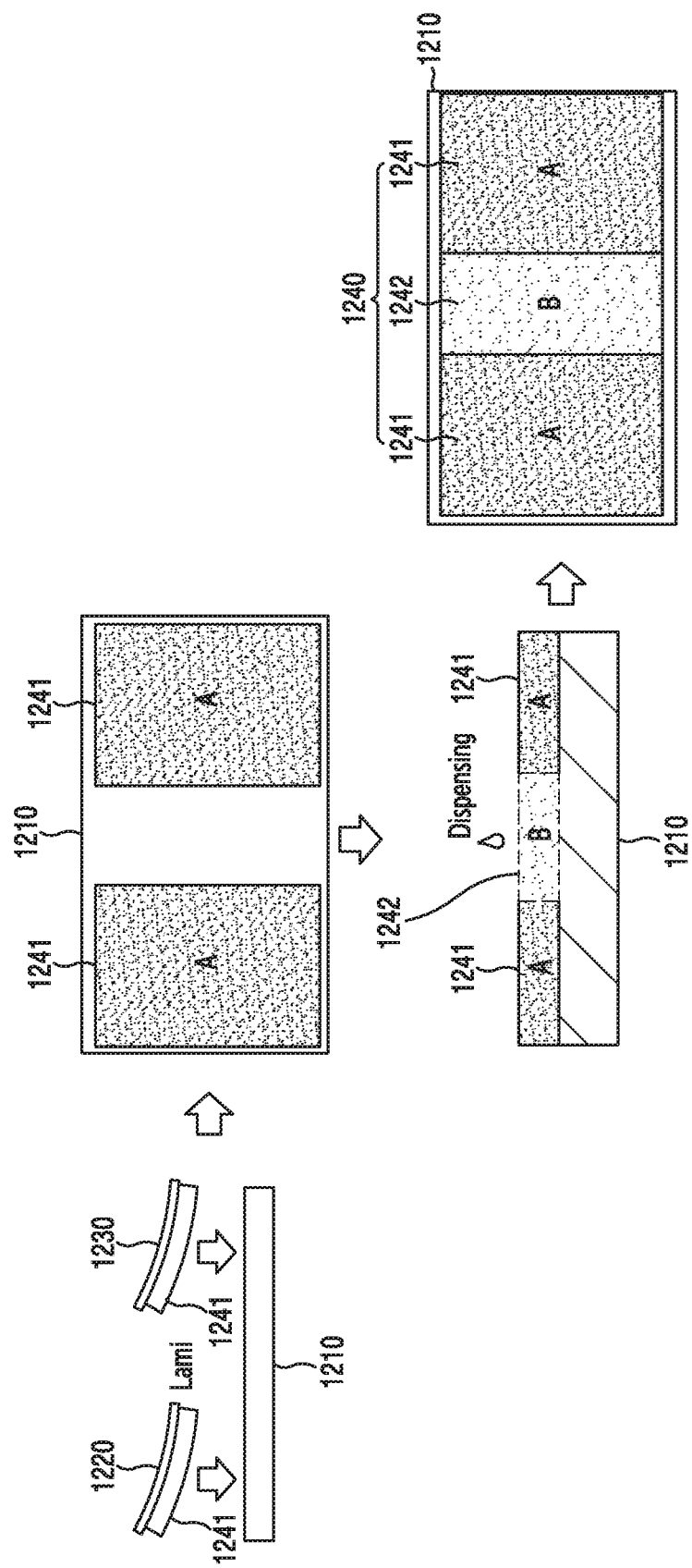
FIG. 12A is a view illustrating a process of forming an adhesive layer through a laminating technique and a dispensing technique according to various embodiments of the present disclosure.

FIG. 12A is a view illustrating a process of forming an adhesive layer through a laminating technique and a dispensing technique according to various embodiments of the present disclosure.

Referring to FIG. 12A, a first adhesive member 1241 having been attached to each of a pair of second members 1220 (e.g., the first layer 401, second layer 402, fourth layer 404, fifth layer 406, or eighth layer 408 of FIG. 4) may be attached to a first member 1210 (e.g., the first layer 401, second layer 402, fourth layer 404, fifth layer 406, or eighth layer 408 of FIG. 4) through a laminating process. According to an embodiment, the first adhesive member 1241 may be disposed in a first area (area A) of the first member 1210. Subsequently, a second adhesive member 1242 may be applied through a dispensing process to a second area (area B) adjacent to the first area (area A) of the first member 1210. According to an embodiment, an adhesive layer 1240 formed through the manufacturing process described above may include the first adhesive member 1241 disposed in the first area (area A) of the first member 1210, and the second adhesive member 1242 disposed in the second area (area B) of the first member 1210. However, the present disclosure is not limited thereto. The second adhesive member 1242 may be applied not only to the second area of the first member 1210 but also to the first area in which the first adhesive member 1241 is disposed.

According to various embodiments, the adhesive layer 502 of FIG. 5A may be formed through the process of FIG. 12A.

Figure 12B:
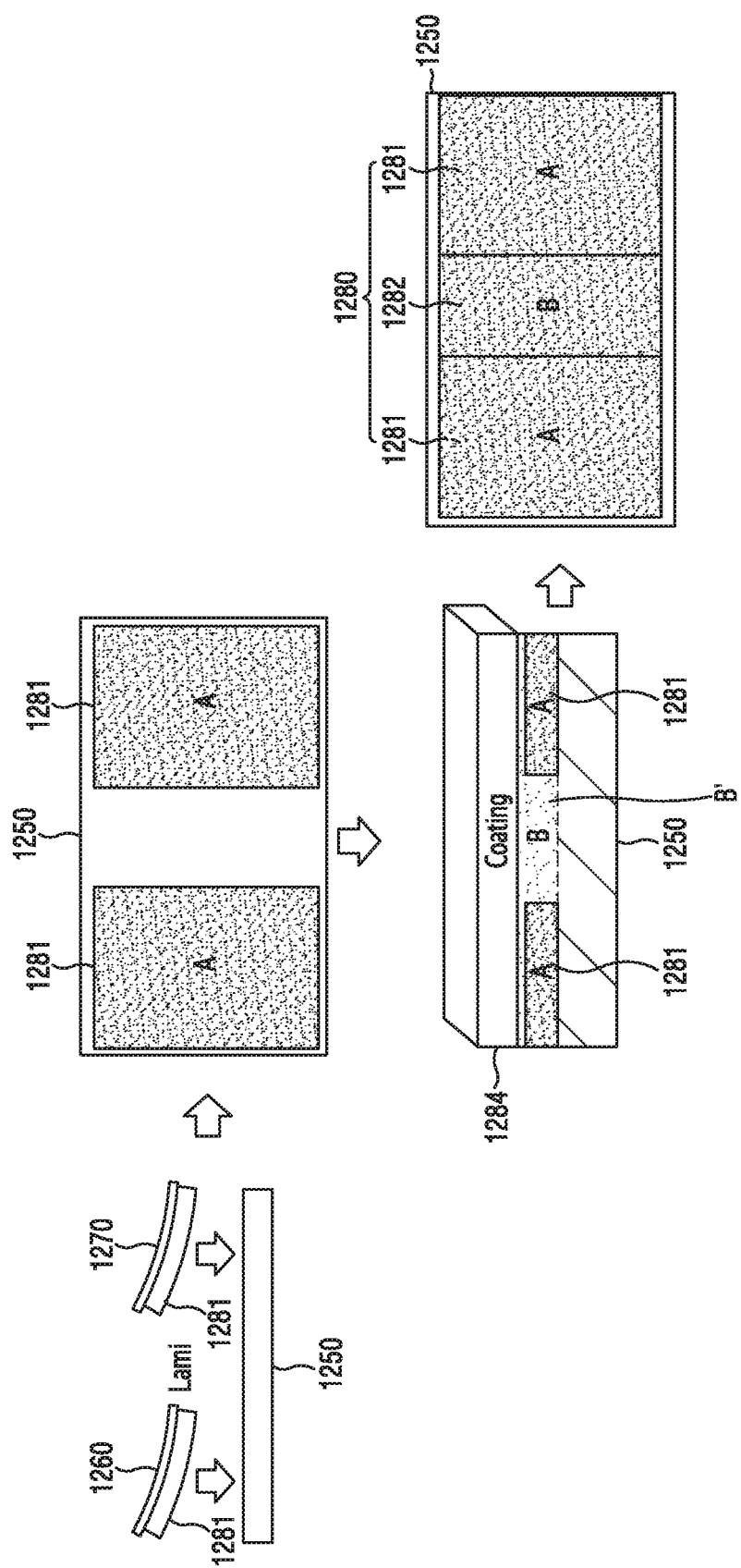
FIG. 12B is a view illustrating a process of forming an adhesive layer through a laminating technique and a coating technique according to various embodiments of the present disclosure.

FIG. 12B is a view illustrating a process of forming an adhesive layer through a laminating technique and a coating technique according to various embodiments of the present disclosure.

Referring to FIG. 12B, a first adhesive member 1281 having been attached to each of a pair of second members 1260 (e.g., the first layer 401, second layer 402, fourth layer 404, fifth layer 406, or eighth layer 408 of FIG. 4) may be attached to a first member 1250 (e.g., the first layer 401, second layer 402, fourth layer 404, fifth layer 406, or eighth layer 408 of FIG. 4) through a laminating process. According to an embodiment, the first adhesive member 1281 may be disposed in a first area (area A) of the first member 1250. Subsequently, a second adhesive member 1282 may be applied through a coating process by a head 1284 of an adhesive applying device to a second area (area B) adjacent to the first area (area A) of the first member 1250. According to an embodiment, the head 1284 may include a second adhesive member discharge port (B') having sufficient size to include the second area (area B) and the first area (area A). According to an embodiment, an adhesive layer 1280 formed through the manufacturing process described above may include the first adhesive member 1281 disposed in the first area (area A) of the first member 1250, and the second adhesive member 1282 disposed in the second area (area B) of the first member 1250. According to an embodiment, the first adhesive member 1281 may be disposed not only in a first area of the first member 1250 but also in the upper side of the second area. However, the present disclosure is not limited thereto. The first adhesive member 1281 may be disposed only in a first area (area A) of the first member 1250 as well.

According to various embodiments, the adhesive layer 602 of FIG. 6A or the adhesive layer 702 of FIG. 7A may be formed through the process of FIG. 12B.

Figure 13A:
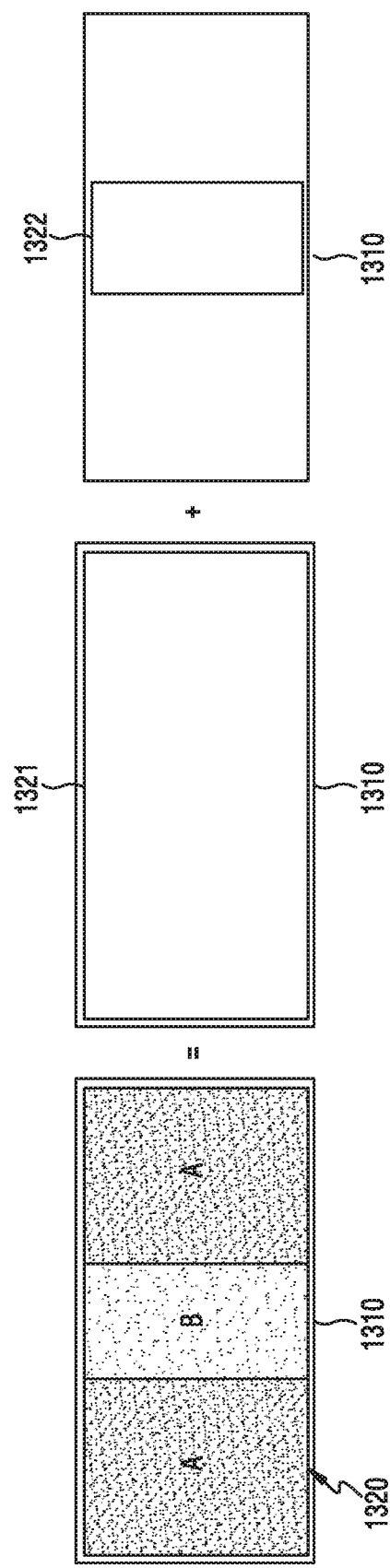
FIG. 13A is a view illustrating an adhesive layer forming process by using a dam according to various embodiments of the present disclosure.

FIG. 13A is a view illustrating an adhesive layer forming process by using a dam according to various embodiments of the present disclosure.

As illustrated in FIG. 13A, an adhesive layer (e.g., 4031, 4051, 4071, 4091, 4032, 4052, 4072, or 4092) may be formed using a dam 1320. According to an embodiment, the dam 1320 may be disposed on the upper side of a member 1310. According to an embodiment, the dam 1320 may include a first dam 1321 to allow a first adhesive member to be disposed in a first area (area A) of the member, and a second dam 1322 to allow a second adhesive member to be disposed in a second area (area B) of the member. According to an embodiment, the second dam 1322 may be disposed in the first area (area A) included in the first dam 1321. According to an embodiment, the dam 1320 may include a side surface having a predetermined height along the edge thereof. Such a side surface may prevent a liquid type adhesive member from escaping outside the areas (areas A and B) described above.

According to various embodiments, the adhesive layer 502 of FIG. 5A may be formed through the process of FIG. 13A.

Figure 13B:
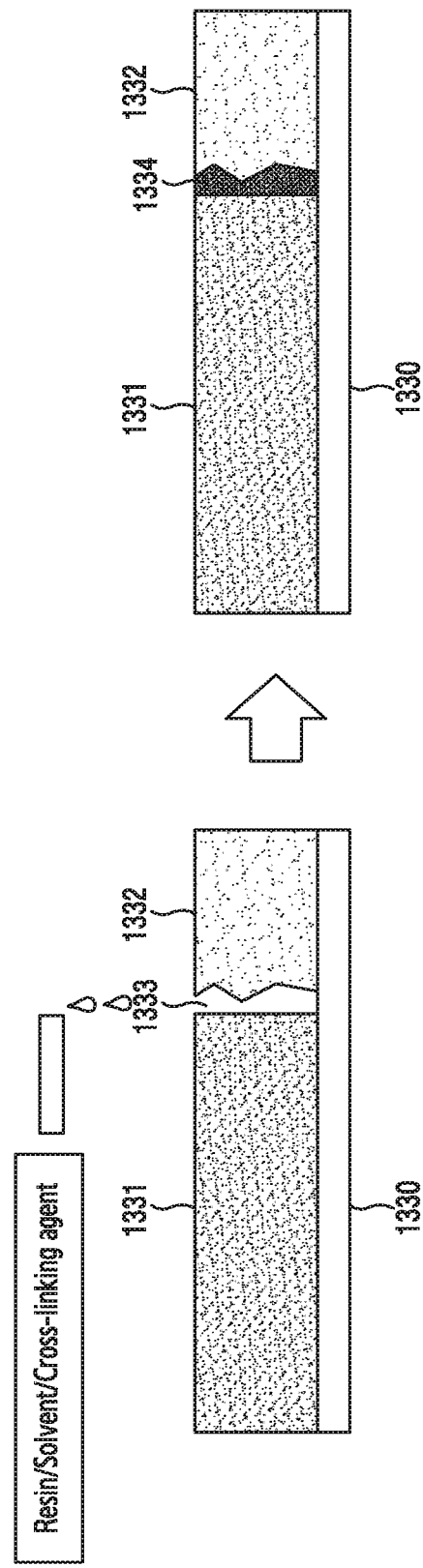
FIG. 13B is a view of an adhesive layer to which a filling member for filling a gap opening up between two adhesive members having characteristics different from each other is applied, according to various embodiments of the present disclosure.

FIG. 13B is a view of an adhesive layer (e.g., 4031, 4051, 4071, 4091, 4032, 4052, 4072, or 4092) to which a filling member for filling a gap opening up between two adhesive members having characteristics different from each other is applied, according to various embodiments of the present disclosure.

Referring to FIG. 13B, adhesive members 1331 and 1332 having attributes different from each other may be disposed on the upper side of the member 1330 (e.g., the first layer 401, second layer 402, fourth layer 404, fifth layer 406, or eighth layer 408 of FIG. 4). According to an embodiment, an attribute of one adhesive member 1331 may be formed to be harder than an attribute of the other adhesive member 1332. According to an embodiment, one adhesive member 1331 may have a modulus characteristic equal to or greater than $5 \times 10^5$ pascal (Pa). According to an embodiment, the other adhesive member 1332 may have a modulus characteristic smaller than $5 \times 10^5$ pascal (Pa). According to an embodiment, when adhesive members 1331 and 1332 having attributes different from each other are arranged on the upper side of the member 1330 to form a single adhesive layer, a gap 1333 may be formed along a boundary portion between adhesive members 1331 and 1332. According to an embodiment, the gap 1333 may be filled with a filling member 1334. According to an embodiment, the filling member 1334 may be made of a transparent material. According to an embodiment, the filling member 1334 may include a resin, a solvent, or a cross-linking agent.

Figure 13C:
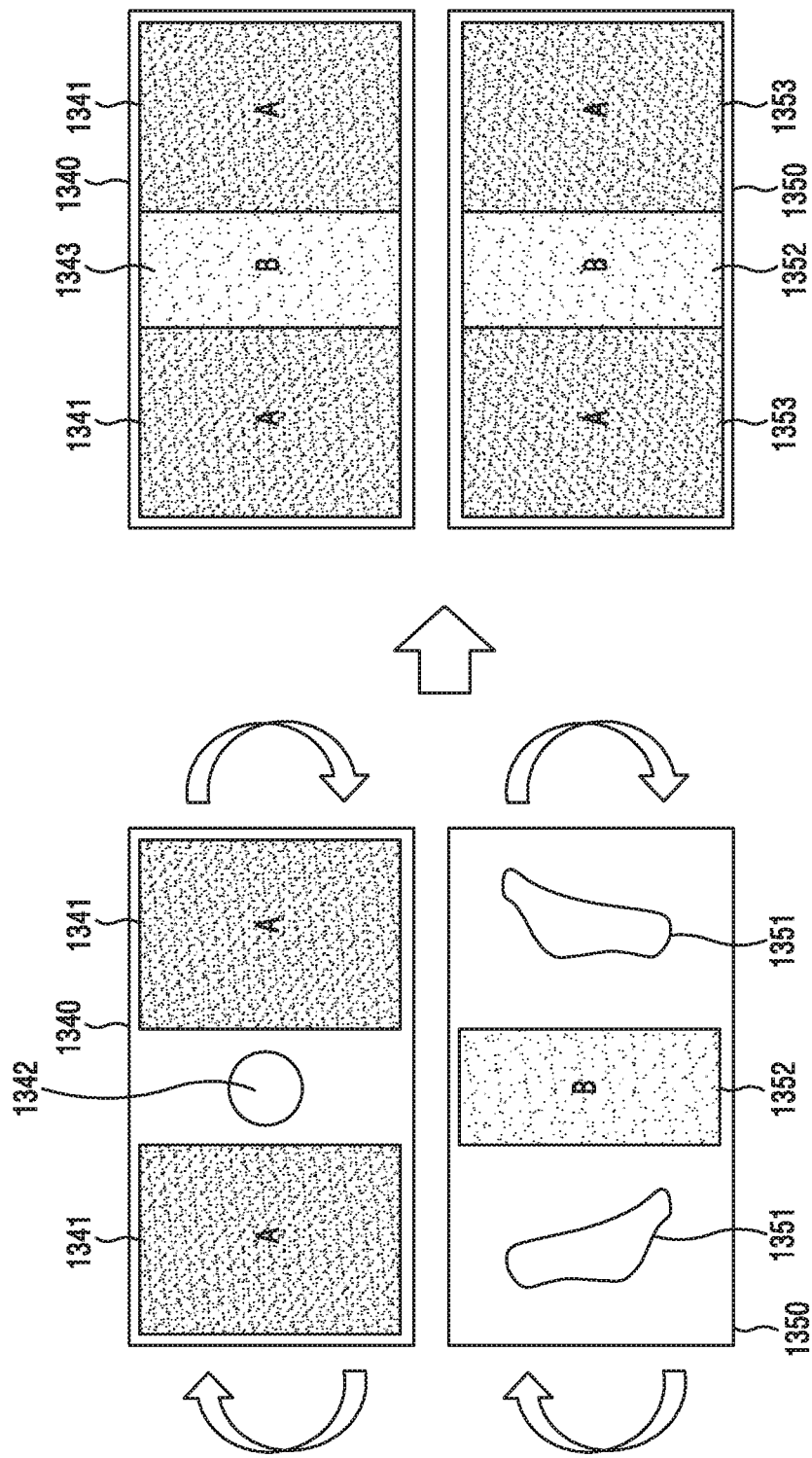
FIG. 13C is a view illustrating a process of forming an adhesive layer through a spin coating technique according to various embodiments of the present disclosure.

FIG. 13C is a view illustrating a process of forming an adhesive layer through a spin coating technique according to various embodiments of the present disclosure.

Referring to FIG. 13C, in the upper part of the view, a first adhesive members 1341 may be disposed in a first area (area A) of a member 1340 (e.g., the first layer 401, second layer 402, fourth layer 404, fifth layer 406, or eighth layer 408 of FIG. 4). According to an embodiment, the first adhesive member 1341 may be attached to the member through a process of coating, laminating, or the like. According to an embodiment, a liquid type adhesive 1342 may be applied to a partial area of a second area (area B) of the member 1340. Subsequently, as the member 1340 is rotated at a predetermined speed, the liquid type adhesive 1342 may be uniformly spread across the second area (area B) of the member 1340 and disposed to have a shape of a second adhesive member 1343.

According to various embodiments, in the lower part of FIG. 13C, a second adhesive member 1352 may be disposed on a second area (area B) of a member 1350. According to an embodiment, the second adhesive member 1352 may be attached to the member 1350 through a process of coating, laminating, or the like. According to an embodiment, a liquid type adhesive 1351 may be applied to a partial area of a first area (area A) of the member 1350. Subsequently, as the member 1350 is rotated at a predetermined speed, the liquid type adhesive 1351 may be uniformly spread across the first area (area A) of the member 1350 and disposed to have a shape of a first adhesive member 1353.

Figure 13D:
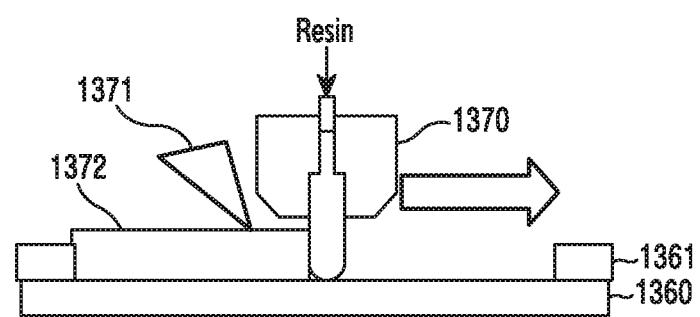
FIG. 13D is a view illustrating a process of levelling an adhesive layer by a scraper according to various embodiments of the present disclosure.

FIG. 13D is a view illustrating a process of levelling an adhesive layer by a scraper according to various embodiments of the present disclosure.

Referring to FIG. 13D, a liquid type adhesive member 1372 applied by a coating head 1370 may be uniformly applied to the upper side of a member 1360 (e.g., the first layer 401, second layer 402, fourth layer 404, fifth layer 406, or eighth layer 408 of FIG. 4) in response to transfer of the head 1370 or transfer of the member 1360. According to an embodiment, with regard to the liquid type adhesive member 1372, a dam 1361 disposed on the upper side of the member 1360 may prevent the liquid type adhesive member 1372 from invading any other area of the member 1360 excepting an area thereof where the adhesive member 1372 is to be applied. According to an embodiment, a scraper 1371 may be disposed on one side of the head 1370. According to an embodiment, the scraper 1371 may level an upper surface of the applied liquid type adhesive member 1372.

Figure 14A:
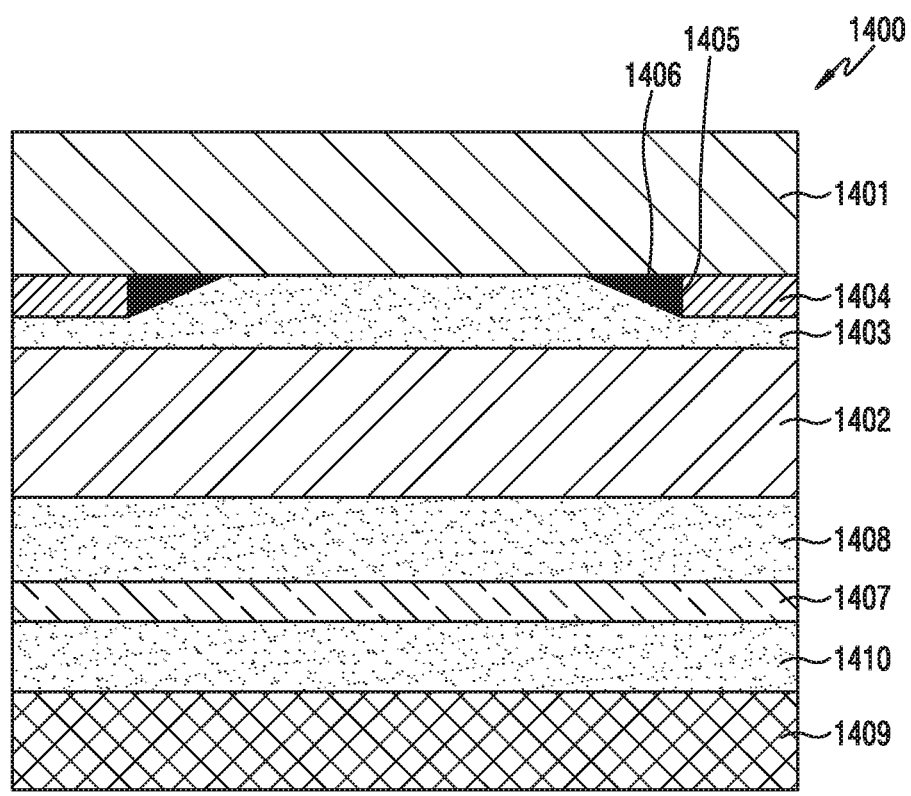
FIGS. 14A and 14B are views illustrating a structure of a display to which a filling member for filling a gap opening up in an adhesive layer therewith is applied, according to various embodiments of the present disclosure.
Figure 14B:
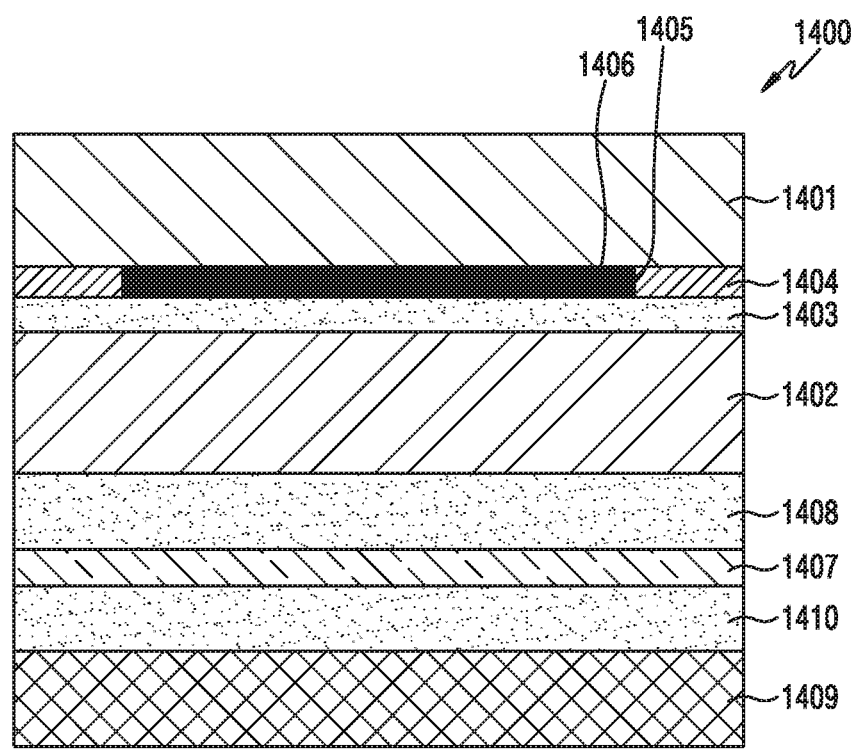
Figure 14C:
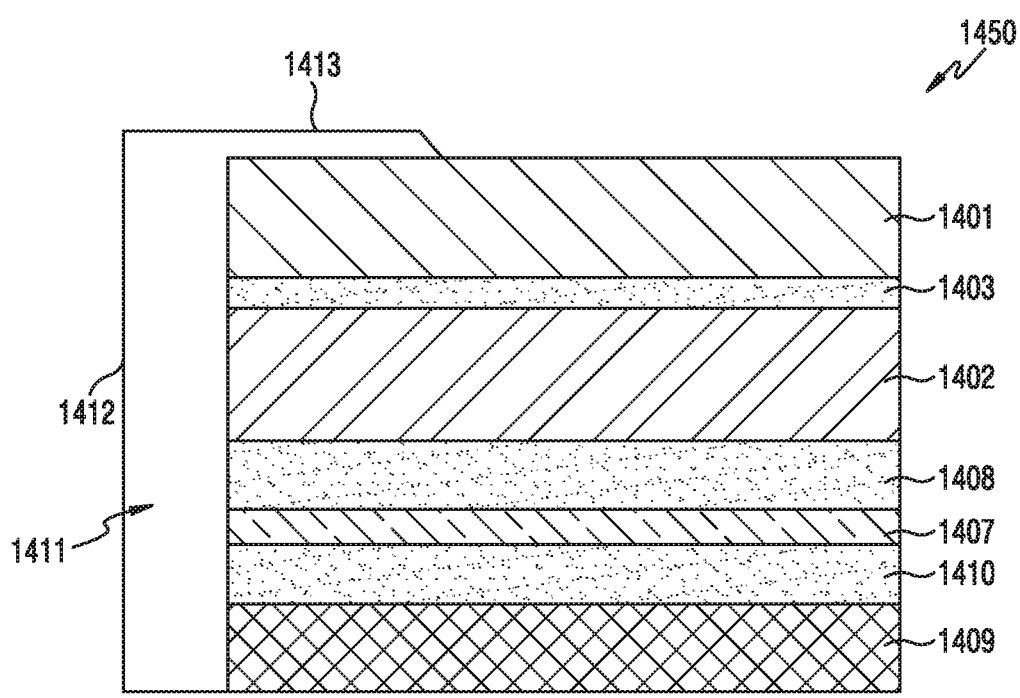
FIG. 14C is a view illustrating a configuration allowing at least a part of an external frame to cover at least a part of a display in order to prevent a gap opening up in an adhesive layer according to various embodiments of the present disclosure.

FIGS. 14A and 14B are views illustrating a structure of a display to which a filling member for filling a gap opening up in an adhesive layer therewith is applied, according to various embodiments of the present disclosure. FIG. 14C is a view illustrating a configuration allowing at least a part of an external frame to cover at least a part of a display in order to prevent a gap opening up in an adhesive layer according to various embodiments of the present disclosure.

Displays 1400 of FIGS. 14A to 14C may be similar to the display 300 of FIG. 3A or the display 400 of FIG. 4, or may be another embodiment of a display.

Referring to FIG. 14A, the display 1400 may include a first layer 1401 (e.g., the first layer 401 of FIG. 4) including a first member, a second layer 1402 (e.g., the second layer 402 and/or the fourth layer 404 of FIG. 4) including a second member formed under the first layer 1401, and a third layer 1403 including a third member formed between the first layer 1401 and the second layer 1402. According to an embodiment, the first member of the first layer 1401 may include a window film made of a transparent material and formed into the outer surface of the display. According to an embodiment, the second member of the second layer 1402 may include a touch panel and/or a polarizing plate. According to an embodiment, the third layer 1403 may be applied as an adhesive layer including an adhesive member having a particular adhesive attribute for joining the first layer 1401 and the second layer 1402.

According to various embodiments, the display 1400 may further include a fourth layer 1407 (e.g., the fifth layer 406 of FIG. 4), which is formed under the second layer 1402 and includes a fourth member, and a fifth layer 1409 (e.g., the eighth layer 408 of FIG. 4), which is formed under the fourth layer 1407 and includes a fifth member. According to an embodiment, an adhesive layer 1408 may be disposed between the second layer 1402 and the fourth layer 1407 as well, and an adhesive layer 1410 may be disposed between the fourth layer 1407 and the fifth layer 1409 as well. According to an embodiment, the fourth member of the fourth layer 1407 may include a flexible display panel. According to an embodiment, the fifth member of the fifth layer 1409 may include a protection film.

According to various embodiments, the first layer 401 of FIG. 4 corresponding to the first layer 1401 of FIG. 14A may include a window film. According to an embodiment, the second layer 402 and/or the fourth layer 404 of FIG. 4 corresponding to the second layer 1402 of FIG. 14A may include a touch panel and/or a polarizing plate. According to various embodiments, the fifth layer 406 of FIG. 4 corresponding to the fourth layer 1407 of FIG. 14A may include a flexible display. According to an embodiment, the eighth layer of FIG. 4 corresponding to the fifth layer 1409 of FIG. 14A may include a protection film and/or an elastic member. According to various embodiments, the display 1400 may be applied as a flexible display. Therefore, attributes of the adhesive layer 1403 for attaching the second layer 1402 and the first layer 1401 disposed at the outermost of the display 1400 are important. For example, in order to improve impact-resistance thereof against external impact, the adhesive layer 1403 may be increased in thickness. However, the adhesive layer 1403 having such an increased thickness may increase an entire thickness of the flexible display 1400, and consequently, a trade-off problem with making an electronic device slim may be caused.

Various embodiments of the present disclosure may allow a window film applied as the first layer 1401 and the adhesive layer 1403 applied as the third layer 1403 to have significantly reduced thickness and may allow an adhesive member included in the third layer 1403 to be formed to have a modulus characteristic greater than or equal to a predetermined value. According to an embodiment, an adhesive member disposed on the third layer 1403 is formed to have the thickness equal to or smaller than 15 μm and has a modulus characteristic equal to or greater than $5 \times 10^5$ pascal (Pa), and thus the first layer 1401 and the second layer 1402 may be implemented into one body through the adhesive member. This implementation allows significant reduction in thickness, compared with existing adhesive layers ranging between 50 μm and 100 μm inclusive, and thus allows high strength adhesion of an adhesive member and a high modulus characteristic, so as to have improved fatigue resistance to frequent opening or closing, and improved impact-resistance against external impact.

According to various embodiments, as illustrated in FIGS. 14A and 14B, when the adhesive layer of the third layer 1403 applied under the first layer 1401 applied as the window film is formed to have a thickness smaller than or equal to 15 μm, an air gap 1405 may be formed therein by a print layer 1404 (e.g., a print thickness ranging between 10 μm and 40 μm inclusive) formed on the rear surface of the window film. According to an embodiment, in order to remove such an air gap 1405, the air gap 1405 may be filled with a transparent filling member 1406. According to an embodiment, the filling member 1406 may include a transparent resin.

Referring to FIG. 14C, a print layer may be disposed on an outer housing 1411 supporting a flexible display 1450. According to an embodiment, the outer housing 1411 may include a side surface housing 1412 supporting a side surface of the flexible display 1450 and an upper housing 1413 supporting at least a part of the upper surface of a first layer 1401 of the flexible display 1450. According to an embodiment, the upper housing 1413 may be applied as a bezel area arranged along the edge of the display 1450 of an electronic device. The print layer may be formed in this bezel area and thus excluded from a third layer 1403 (e.g., an adhesive layer) disposed between a second layer 1402 and the first layer 1401 applied as a window film, such that appearance of an air gap may be prevented in advance.

Figure 15A:
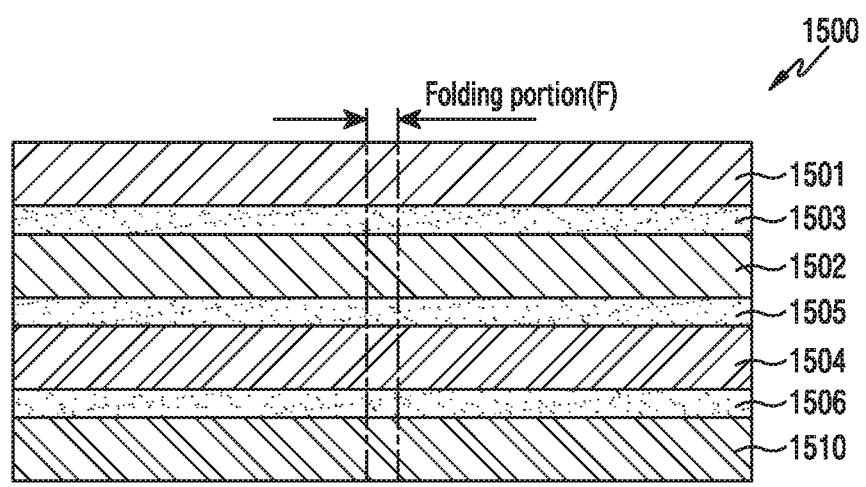
FIG. 15A is a view illustrating a structure of a display including a cushion layer according to various embodiments of the present disclosure.

FIG. 15A is a view illustrating a structure of a display including a cushion layer according to various embodiments of the present disclosure.

Referring to FIG. 15A, a folding portion (F) of a display 1500 may correspond to area B of the display 301 configured to be folded by pivotal movement of two bodies 310 and 320 of FIG. 3A. According to an embodiment, the display 1500 may include a first layer 1501 (e.g., the first layer 401 of FIG. 4) including a first member, a second layer 1502 (e.g., the second layer 402 of FIG. 4) including a second member formed under the first layer 1501, and a first adhesive layer 1503 (e.g., the third layer 403 of FIG. 4) formed between the first layer 1501 and the second layer 1502. According to an embodiment, the first member of the first layer 1501 may include a window film made of a transparent material and formed into the outer surface of the display. According to an embodiment, the second member of the second layer 1502 may include a touch panel and/or a polarizing plate. According to an embodiment, the first adhesive layer 1503 may include an adhesive member having a particular adhesive attribute for joining the first layer 1501 and the second layer 1502.

According to various embodiments, the display 1500 may further include a third layer 1504 (e.g., the fifth layer 406 of FIG. 4), which is formed under the second layer 1502 and includes a third member, and a fourth layer 1510 (e.g., the eighth layer 408 of FIG. 4), which is formed under the third layer 1504 and includes a fourth member. According to an embodiment, a second adhesive layer 1505 (e.g., the sixth layer 407 and/or the seventh layer 405 of FIG. 4) may be disposed between the second layer 1502 and the third layer 1504 as well, and a third adhesive layer 1506 (e.g., the ninth layer 409 of FIG. 4) may be disposed between the third layer 1504 and the fourth layer 1510 as well. According to an embodiment, the third member of the third layer 1504 may include a flexible display panel. According to an embodiment, the fourth member of the fourth layer 1510 may include a cushion member.

According to various embodiments, the display 1500 may be applied as a flexible display. Therefore, as a cushion member to be applied as the fourth layer 1510, a member having a predetermined density may be applied thereto. According to an embodiment, when the first layer 1501 of the flexible display 1500, that is, the upper surface of the window film takes external impact, for example, surface-impact, a cushion member having a mostly hard characteristic and density may be required for distribution of the impact concentrated thereon. According to an embodiment, when external impact is point-impact, a cushion member having a suitable characteristic and density may be used to distribute the impact concentrated thereat. The density of the cushion member formed to effectively distribute point-impact may be formed to be greater than the density of the cushion member formed to distribute surface-impact.

According to various embodiments of the present disclosure, the display 1500 may include a cushion member 1510 having a characteristic allowing taken random kinds of impact (surface-impact and/or point-impact) to be fully smoothly absorbed and distributed. The cushion members will be hereinafter described in detail.

FIGS. 15B to 15F are requirement configuration views illustrating the cushion layer 1510 of FIG. 15A according to various embodiments of the present disclosure.

Figure 15B:
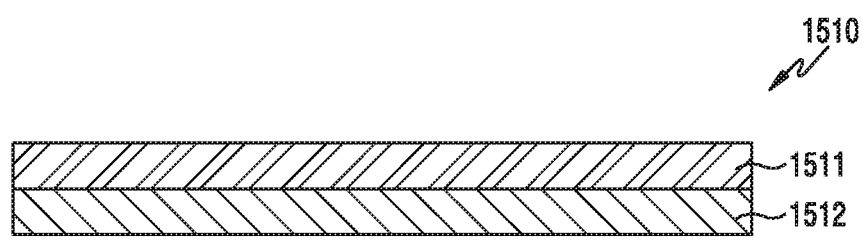
FIGS. 15B to 15F are requirement configuration views illustrating the cushion layer of FIG. 15A according to various embodiments of the present disclosure.

Referring to FIG. 15B, the cushion member 1510 may include a first cushion member 1511 and a second cushion member 1512 disposed beneath the first cushion member 1511. According to an embodiment, the cushion member 1510 may be made of an acrylic, a urethane, or a silicone material. According to an embodiment, the first cushion member 1511 may have a density greater than that of the second cushion member 1512, so as to be formed into a high density layer. According to an embodiment, the first cushion member 1511 may be a relatively high density layer and thus have restitution elasticity with respect to point-impact, so as to effectively distribute external point-impact. According to an embodiment, the second cushion member 1512 disposed beneath the first cushion member 1511 may have restitution elasticity with respect to surface-impact. With respect to surface-impact that the display has taken from the outside, the impact may be firstly absorbed while passing through the first cushion member 1511, which is a high density layer, and may be counterbalanced through the second cushion member 1512. According to an embodiment, the first cushion member 1511 may be configured to embody a density characteristic greater than or equal to 0.6 g/cm3. According to an embodiment, the second cushion member 1512 may be configured to embody a density characteristic smaller than or equal to 0.4 g/cm3.

Figure 15C:
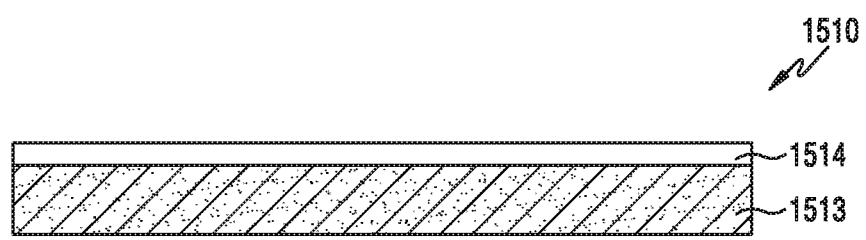

Referring to FIG. 15C, a cushion member 1510 may include a third cushion member 1513 and a coating layer 1511 disposed on the third cushion member 1513. According to an embodiment, the third cushion member 1513 may be a relatively high density layer, thereby exhibiting restitution elasticity with respect to point-impact. According to an embodiment, the third cushion member 1513 may be configured to embody a density characteristic greater than or equal to 0.6 g/cm3. According to an embodiment, the coating layer 1514 may be laminated on the third cushion member 1513, thereby performing a role in distributing point-impact. According to an embodiment, the coating layer 1514 may be made of a resin or a PET material.

Figure 15D:
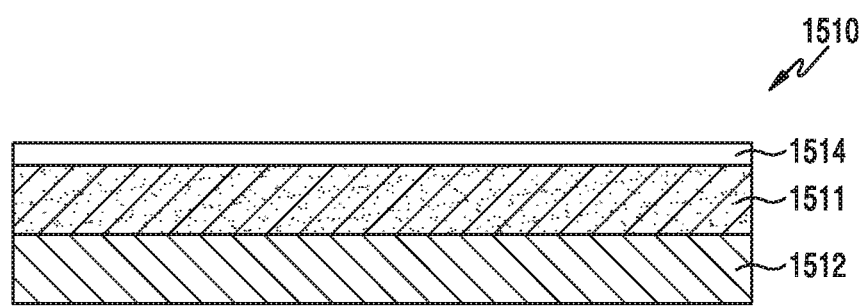

Referring to FIG. 15D, a cushion member 1510 may include a first cushion member 1511 having the density characteristic disclosed in FIG. 15B, a second cushion member 1512 disposed beneath the first cushion member 1511, and a coating layer 1514 laminated on the first cushion member 1511. According to an embodiment, the additional configuration of the coating layer 1514 allows restitution elasticity and/or distribution of point-impact and allows additional counterbalancing with respect to surface-impact.

Figure 15E:
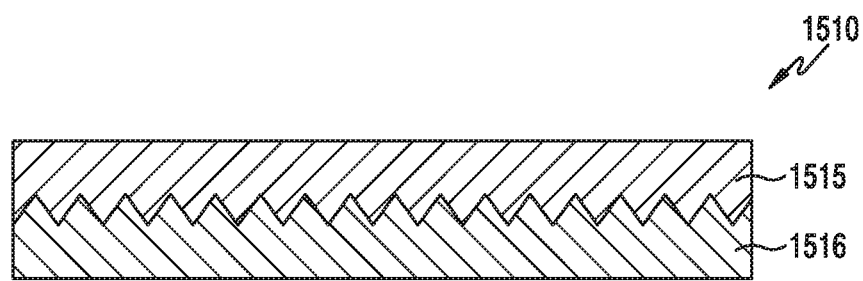

Referring to FIG. 15E, a cushion member 1510 may include a first cushion member 1515 having a density characteristic corresponding to the density characteristic disclosed in FIG. 15B, and a second cushion member 1516 disposed beneath the first cushion member 1515. According to an embodiment, the first cushion member 1515 and the second cushion member 1516 may have coupling surfaces formed to have a repetitive recess-coupling structure. According to an embodiment, the coupling surface of the first cushion member 1515 may have a plurality of protrusion portions spaced a predetermined interval apart, and the coupling surface of the second cushion member 1516 may have a plurality of recess portions spaced a predetermined interval apart. According to an embodiment, the recess-coupling structure may be configured such that at least one protrusion portion selected from a serrated protrusion portion, a round-ended protrusion portion, and a trapezoidal protrusion portion is coupled to a recess portion having a corresponding shape. However, the present disclosure is not limited thereto. The recess-coupling structure may be one in which an irregular protrusion portion and a corresponding recess portion are coupled to each other. According to an embodiment, such a recess-coupling structure may play a role in more efficiently distributing external point-impact within the cushion member.

Figure 15F:
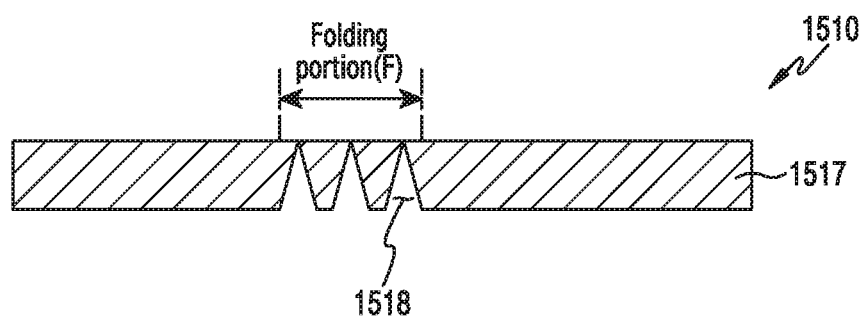

Referring to FIG. 15F, a cushion member 1510 may include a first cushion member 1517 and at least one cutting groove 1518 formed at least partially in an area of the rear surface of the first cushion member. According to an embodiment, the area in which the cutting groove 1518 is formed may be disposed in an area in which deformation of the flexible display occurs (foldable). According to an embodiment, the flexible display may have a deformation characteristic (e.g., a bending characteristic) improved by the cutting groove 1518 of an elastic member 1510. According to an embodiment, the end of the cutting groove 1518 is formed sharply, yet is not limited thereto. For example, the end of the cutting groove may be formed to have a curved shape or a flat surface.

Figure 16A:
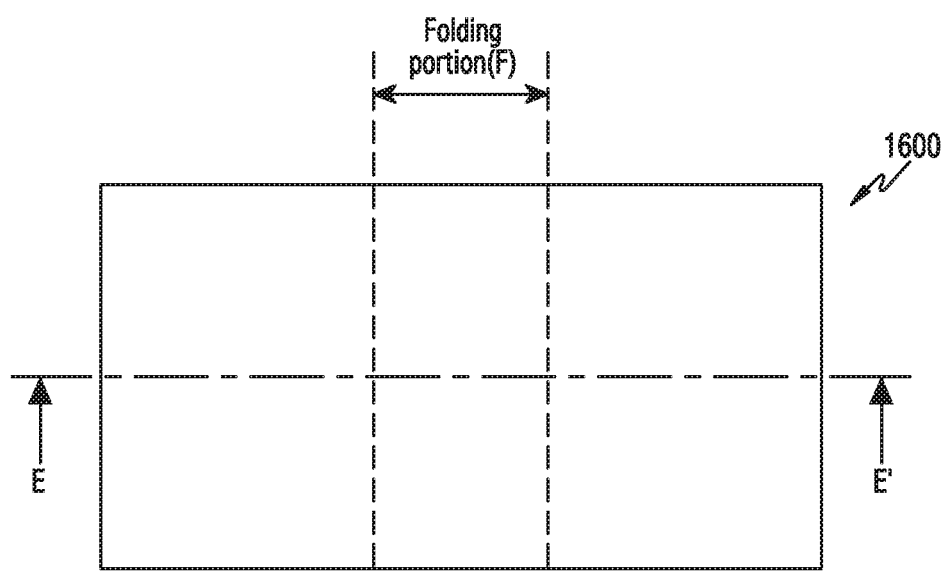
FIGS. 16A to 16C are views illustrating variation of thickness of an adhesive layer in response to bending of a foldable display according to various embodiments of the present disclosure.
Figure 16B:
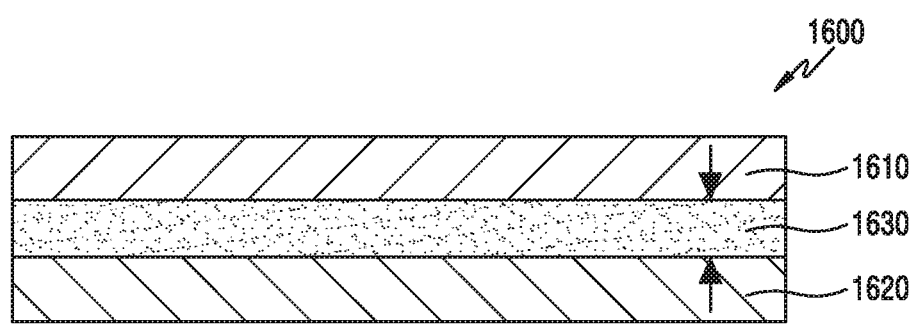
Figure 16C:
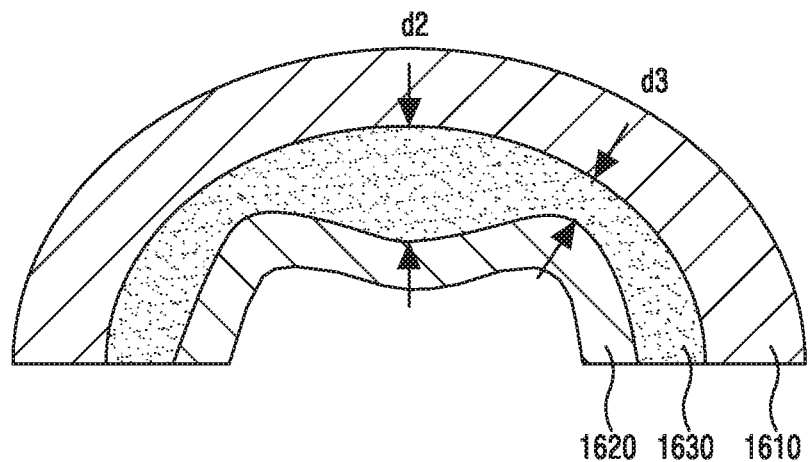

FIGS. 16A to 16C are views illustrating variation of thickness of an adhesive layer 1630 in response to bending of a foldable display 1600 according to various embodiments of the present disclosure.

FIG. 16A is a top view of a display including a folding portion (F), FIG. 16B is a recess portion cross-sectional view of the display 1600 viewed from the line E-E' of FIG. 16A, and FIG. 16C is a view illustrating a state where the display 1600 of FIG. 16B is bent.

Referring to FIGS. 16A and 16B, the display 1600 may include a first substrate 1610, a second substrate 1620 laminated on the first substrate 1610, and an adhesive layer 1630 (e.g., an OCA, a PSA, etc.) interposed between the first substrate 1610 and the second substrate 1620 to attach the two substrates thereto. According to an embodiment, the first substrate 1610 may include a touch panel. According to an embodiment, the second substrate 1620 may include at least one substrate adjacent to the touch panel. According to an embodiment, the second substrate 1620 may include at least one among a window film, a polarizing plate, a display module, a cushion member, and a protection member.

According to various embodiments, when the display 1600 is bent, the adhesive layer 1630 having thickness d1 may be deformed to have thickness d2 greater than d1 at in the central portion where the display is bent, and may be deformed to have thickness d3 smaller than d1 in a portion around the central portion. For example, when such deformation occurs, each laminated layer may have tensile/compressive stress, and unavoidable deformation may occur depending on rigidity of a material thereof. There have been efforts to prevent malfunction or breakdown by adding a characteristic compensation algorithm to a touch IC even after deformation. However, touch IC compensation corresponding to every deformation has its limitations, and addition of the algorithm may cause an adverse effect, such as recognition speed degradation, etc. Therefore, overcoming a limitation of physical elasticity recovery of each laminated layer constituting a touch module is required.

Figure 17A:
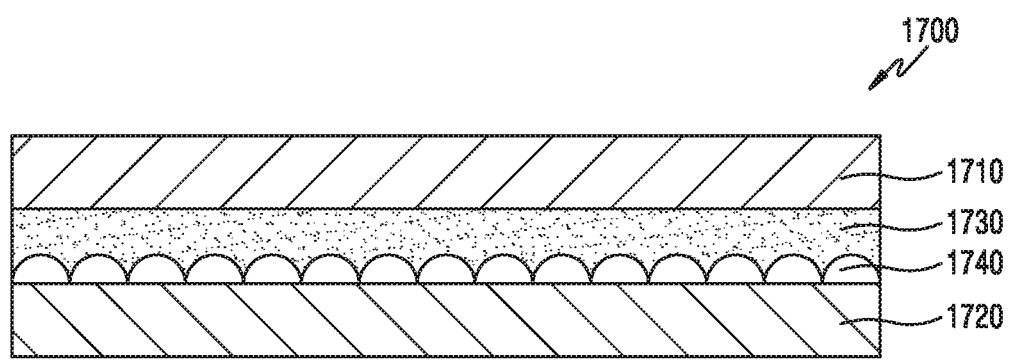
FIGS. 17A and 17B are recess portion cross-sectional views of a display illustrating an adhesive layer including a partitioning wall according to various embodiments of the present disclosure.
Figure 17B:
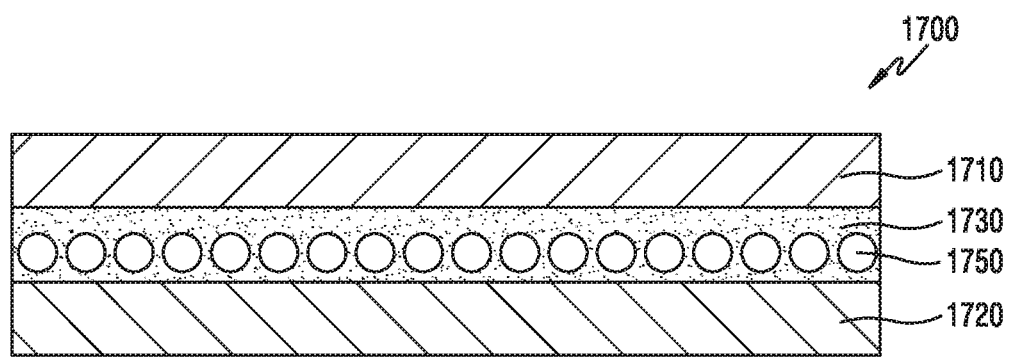

FIGS. 17A and 17B are recess portion cross-sectional views of a display illustrating an adhesive layer 1730 including a partitioning wall 1740 and 1750 according to various embodiments of the present disclosure.

Referring to FIGS. 17A and 17B, the display 1700 may include a first substrate 1710, a second substrate 1720 laminated on the first substrate 1710, and an adhesive layer 1730 (e.g., an OCA, a PSA, etc.) interposed between the first substrate 1710 and the second substrate 1720 to attach the two substrates thereto. According to an embodiment, a plurality of partitioning walls 1740 and 1750 having rigidity different from that of the adhesive layer 1730 may be arranged thereon. According to an embodiment, the partitioning wall 1740 may be formed to have hemispherical shapes continuously formed from one side of the adhesive layer 1730 in a lengthwise direction. According to an embodiment, the partitioning wall 1750 may be formed into a type of sphere-shaped materials continuously arranged at the center of the adhesive layer 1730 while in contact with one another or being spaced a predetermined interval apart from one another.

According to various embodiments, the plurality of partitioning walls 1740 and 1750 may be made of a material having rigidity harder than that of the adhesive layer, but may be made of a material having different rigidity depending on arrangement positions thereof. According to an embodiment, the partitioning walls 1740 and 1750 may be made of a material having rigidity gradually increasing from the edge of the display 1700 toward an area in which maximum bending occurs. According to an embodiment, the partitioning walls 1740 and 1750 may be arranged only in an area, configured to be bent, of the display 1700. However, the present disclosure is not limited thereto. The partitioning walls 1740 and 1750 may be arranged even in an area, configured not to be bent, of the display 1700.

According to various embodiments, the partitioning walls 1740 and 1750 may be made of a material having rigidity harder than that of the adhesive layer 1730 and may uniformly maintain the thickness of the adhesive layer 1730 when the display 1700 is bent. According to an embodiment, the partitioning walls 1740 and 1750 may include a transparent optical adhesive film, a hard coating material, or the like. According to an embodiment, compared with the adhesive layer 1730, the partitioning walls 1740 and 1750 may include a material having relatively higher modulus of elasticity and may include a material having touch operation performance-related permittivity relatively smaller than or equal to the equivalent.

According to various exemplary embodiments, the above-mentioned adhesive film may be formed by photocuring, for example, through light irradiation such as UV, or thermally curing an adhesive agent composition including a monomer selected from ethyl hexyl acrylate (2-EHA), isobonyl acrylate (IBOA), hydroxy ethyl acrylate (HEA), hydroxyl butyl acrylate (HBA), hydroxyl propyl acrylate (HPA), or hexyl methacrylate (HMA) or a combination of at least two thereof, a photoinitiator, a crosslinking agent, or other additives.

According to various exemplary embodiments, the above-mentioned hard coating layer may be formed of a monomer or oligomer of a photocurable compound selected from urethane acrylate, epoxy acrylate, polyether acrylate, polyester acrylate, dipentaerythritol hexaacrylate, dipentaerythritol pentaacrylate, pentaerythritol tetraacrylate, dipentaerythritol hexaacrylate, or a combination of at least two thereof.

According to various embodiments, the partitioning walls 1740 and 1750 may be configured to include a plate-shaped structure and to be formed into a surface protrusion and recess, a three-dimensional structure, or the like. According to an embodiment, the partitioning walls may be made of a high elasticity polymer material which can limit, to a predetermined distance or less, variation of a distance between touch electrodes lastly interacting with each other. According to an embodiment, variation margin thereof may be fluid depending on a circuit design and lamination of a touch module yet may be formed to generally range between 5% and 10%.

FIGS. 18A to 18E are recess portion cross-sectional views of an adhesive layer illustrating partitioning wall shapes and arrangement relations according to various embodiments of the present disclosure.

Adhesive layers 1830 of FIGS. 18A to 18E may be similar to the adhesive layers 1730 of FIGS. 17A and 17B or may be another embodiment of an adhesive layer.

Figure 18A:
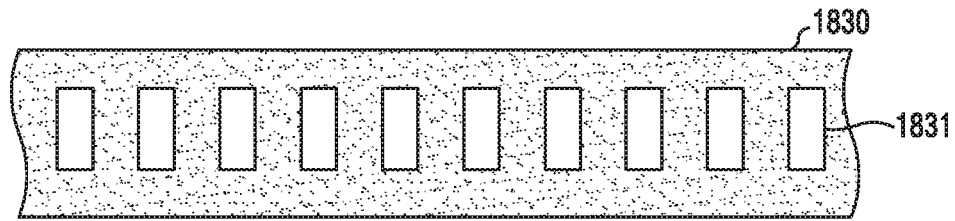
FIGS. 18A to 18E are recess portion cross-sectional views of an adhesive layer illustrating partitioning wall shapes and arrangement relations according to various embodiments of the present disclosure.
Figure 18B:
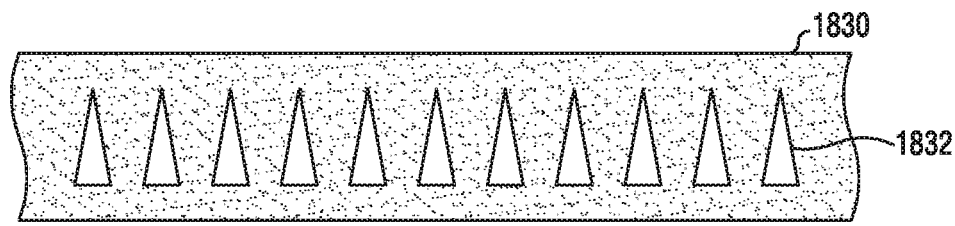
Figure 18C:
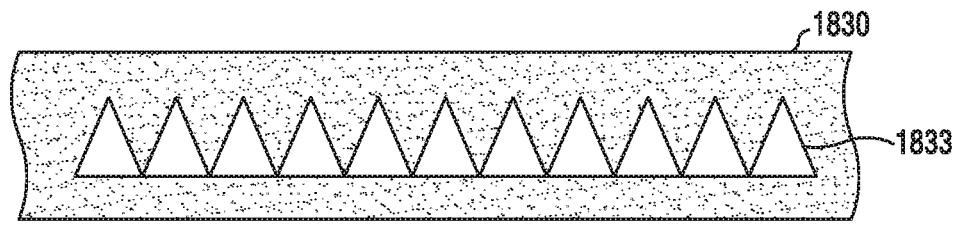
Figure 18D:
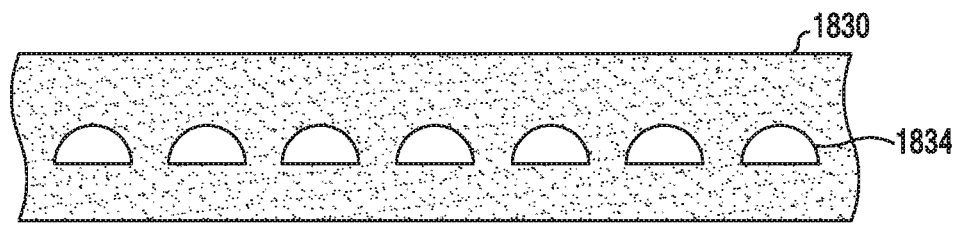
Figure 18E:
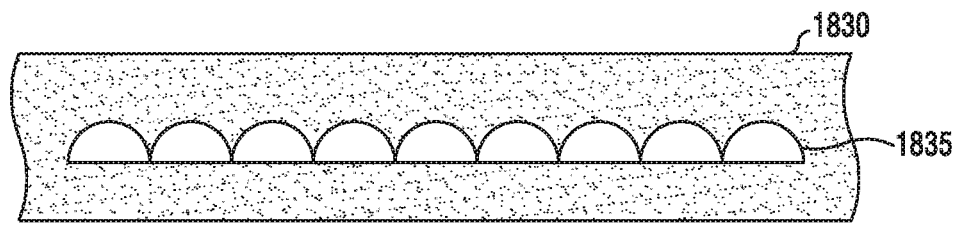

As illustrated in FIG. 18A, rectangle-shaped partitioning walls 1831 may be spaced a predetermined interval apart from each other and may be successively arranged in the adhesive layer 1830. According to an embodiment, as illustrated in FIG. 18B, triangle-shaped partitioning walls 1832 may be spaced a predetermined interval apart from each other and may be successively arranged in the adhesive layer 1830. According to an embodiment, as illustrated in FIG. 18C, triangle-shaped partitioning walls 1833 may be successively arranged in the adhesive layer 1830 while being in contact with each other. According to an embodiment, as illustrated in FIG. 18D, hemisphere-shaped partitioning walls 1834 may be spaced a predetermined interval apart from each other and may be successively arranged in the adhesive layer 1830. According to an embodiment, as illustrated in FIG. 18E, hemisphere-shaped partitioning walls 1835 may be successively arranged in the adhesive layer 1830 while being in contact with each other. In addition, various shapes and arrangements are possible. For example, a shape of partitioning walls and a spacing distance between the partitioning walls may not be limited thereto.

Various embodiments may provide a display device including: a first layer including a first member; a second layer which is formed under the first layer and includes a second member; and a third layer which is formed between the first layer and the second layer and includes an adhesive member, wherein the third layer has a first area which may be formed by using a first adhesive member having a first attribute and has a second area which may be formed by using a second adhesive member having a second attribute.

According to various embodiments, the first member may include a window film.

According to various embodiments, the second member may include a touch panel.

According to various embodiments, the first attribute may be harder than the second attribute.

According to various embodiments, the first adhesive member may have a modulus characteristic greater than or equal to $5 \times 10^5$ pascal (Pa), and the second adhesive member may have a modulus characteristic smaller than $5 \times 10^5$ pascal (Pa).

According to various embodiments, the second area may have a partial area formed to be physically deformable (e.g., foldable, bendable, or flexible) relative to the first area.

According to various embodiments, the display device may further include: a fourth layer which is formed under the second layer and includes a third member; and a fifth layer which is formed under the fourth layer and includes a fourth member, wherein a third adhesive member has the first attribute and is formed in a third area corresponding to the first area on a sixth layer between the fourth layer and the fifth layer, and a fourth adhesive member which has the second attribute and is formed in a fourth area corresponding to the second area on the sixth layer.

According to various embodiments, the third member may include a polarizing plate.

According to various embodiments, the fourth member may include a flexible display panel.

According to various embodiments, the first adhesive member may be formed to have a thickness smaller than or equal to 15 μm (micrometer) between the first layer and the second layer.

According to various embodiments, the display device may further include an air gap formed in at least a part of the third layer, and may include a transparent resin is formed in an at least partial area of the air gap.

According to various embodiments, the display device may further include a cushion layer formed under the first layer and the second layer, wherein the cushion layer includes: a first cushion member having a third attribute; and a second cushion member which has a fourth attribute and is formed under the first cushion member and is in contact with the first cushion member, wherein an adhesive agent adheres to at least a part of a surface of the first cushion member, which is not in contact with the second cushion member.

According to various embodiments, the third attribute may include a characteristic satisfying a condition that a density is greater than or equal to 0.6 g/cm3, and the fourth attribute may include a characteristic satisfying a condition that a density is smaller than or equal to 0.4 g/cm3.

According to various embodiments, the display device may further include a coating layer, wherein the coating layer is formed between the cushion layer and the adhesive agent.

According to various embodiments, surfaces of the first cushion member and the second cushion member, which are in contact with each other, may have serrated shapes engaged with each other.

According to various embodiments, an at least partial area of the first layer and the second layer may be configured to be foldable, and a cutting groove may be formed in an at least partial area of the cushion layer corresponding to an area under the at least partial area configured to be foldable.

According to various embodiments, one adhesive member among the first adhesive member and the second adhesive member may adhere to the first layer and the second layer, the other adhesive member, which is different from the one adhesive member among the first adhesive member and the second adhesive member, may be formed to adhere to one of the first layer and the second layer.

According to various embodiments, the second area of the third layer may be included in the first area, the second adhesive member may be made of a material harder than that of the first adhesive member and may include a plurality of partitioning walls successively arranged therein while being spaced a predetermined interval apart from each other.

Various embodiments may provide a display device and an electronic device including the same, including: a flexible display disposed in a position corresponding to an area configured to be deformable, wherein the flexible display includes a first layer including a first member; a second layer which is formed under the first layer and includes a second member; and a third layer which is formed between the first layer and the second layer and includes an adhesive member, and the third layer has a first area which may be formed by using a first adhesive member having a first attribute, is disposed in the first area, is formed to have a second attribute harder than the first adhesive member, and includes a plurality of walls successively arranged therein while being spaced a predetermined interval apart from each other.

Various embodiments may provide an electronic device including: a flexible display disposed in a position corresponding to an area configured to be deformable, wherein the flexible display includes a first layer including a first member; a second layer which is formed under the first layer and includes a second member; and a third layer which is formed between the first layer and the second layer and includes an adhesive member, and the third layer has a first area which may be formed by using a first adhesive member having a first attribute and has a second area which may be formed by using a second adhesive member having a second attribute.

According to various embodiments, the first attribute may be harder than the second attribute.

According to various embodiments, the second adhesive member may be disposed in a deformable area of the flexible display.

According to various embodiments, the first layer may be a window film including the outer surface of the flexible display, and the second layer may be a flexible display panel of the flexible display.

According to various embodiments, the flexible display may further include a cushion layer formed under the second layer, wherein the cushion layer may have a first cushion member and a second cushion member which have relatively different densities and are arranged so as to be laminated.

Various embodiments may provide a flexible display manufacturing method including the operations of: placing a first adhesive member having a first attribute in a first area of a first member of the flexible display; placing a second adhesive member having a second attribute in a second area of the first member; and attaching a second member of the flexible display to the first area in which the first adhesive member is disposed and to the second area in which the second adhesive member is disposed.

According to various embodiments, the flexible display manufacturing method may include: an operation in which the first attribute is formed to be harder than the second attribute; and an operation in which a modulus characteristic of the first adhesive member is formed to be greater than or equal to $5 \times 10^5$ pascal (Pa), and a modulus characteristic of the second adhesive member is formed to be smaller than $5 \times 10^5$ pascal (Pa).

According to various embodiments, the flexible display manufacturing method may include an operation of placing the first and second adhesive member on the first member through at least one of a coating, a dispensing, a laminating, a squeegeeing, a dropping, and a spin coating process.

According to various embodiments, the operation of placing the first adhesive member may include an operation of placing the first adhesive member up to at least a part of the second area.

According to various embodiments, the operation of placing the second adhesive member may include an operation of placing the second adhesive member up to at least a part of the first area.

According to various embodiments, the flexible display manufacturing method may include the operations of: placing the first adhesive member in the first area of the first member through a laminating process; and placing the second adhesive member in the second area of the first member or the second area including at least a part of the first area through a laminating process, a coating process, or a dispensing process.

According to various embodiments, the flexible display manufacturing method may include the operations of: applying the first adhesive member to the first area of the first member through at least one first discharge ports of an adhesive applying device; and applying the second adhesive member to the second area of the first member or the second area including at least a part of the first area through at least one second discharge ports of the adhesive applying device.

According to various embodiments, the flexible display manufacturing method may include an operation of laminating a third member for distributing impact delivered from the outside of the flexible display under the second member.

According to various embodiments, the flexible display manufacturing method may include an operation of placing the third member by laminating a first cushion member and a second cushion member which have relatively different densities.

According to various embodiments, the flexible display manufacturing method may include an operation of forming at least one cutting groove cut in an upward direction on the rear surface of the third member corresponding to a deformation area of the flexible display.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to the embodiments disclosed herein, the scope of the various embodiments of the present disclosure should be construed to include all modifications or modified forms drawn based on the technical idea of the various embodiments of the present disclosure.

The invention claimed is:

1. An electronic device including a display comprising:
a first layer including a first member;
a second layer which is formed under the first layer and includes a second member; and
a third layer which is formed between the first layer and the second layer and adheres to the first layer and the second layer,
wherein a first area of the third layer is formed using a first adhesive member having a first attribute, a second area of the third layer is formed using a second adhesive member having a second attribute, and a third area of the third layer is formed using the first adhesive member having the first attribute,
wherein the second area separates the first area from the third area,
wherein the first area and the third area are at least partially overlapped by the second area, when the third layer is unbent, and
wherein each of the first area, the second area, and the third area adhere to both of the first layer and the second layer.

2. The electronic device of claim 1, wherein the first member includes a window film.

3. The electronic device of claim 1, wherein the second member includes a touch panel.

4. The electronic device of claim 1, wherein the first attribute is configured to be harder than the second attribute.

5. The electronic device of claim 1, wherein at least a partial area of the second area is formed to be physically deformable relative to the first area.

6. The electronic device of claim 1, further comprising:
a fourth layer which is formed under the second layer and includes a third member; and
a fifth layer which is formed under the fourth layer and includes a fourth member, wherein a third adhesive member has the first attribute and is formed in a fourth area corresponding to the first area on a sixth layer between the fourth layer and the fifth layer, and
a fourth adhesive member which has the second attribute and is formed in a fourth area corresponding to the second area on the sixth layer.

7. The electronic device of claim 6, wherein the third member includes a polarizing plate.

8. The electronic device of claim 7, wherein the fourth member includes a flexible display panel.

9. The electronic device of claim 1, wherein the first adhesive member is formed to have a thickness smaller than or equal to 15 μm (micrometer) between the first layer and the second layer.

10. The electronic device of claim 1, further comprising an air gap formed in at least a part of the third layer, wherein a transparent resin is formed in an at least partial area of the air gap.

11. The electronic device of claim 1, further comprising a cushion layer formed under the first layer and the second layer,
wherein the cushion layer comprises:
a first cushion member having a third attribute; and
a second cushion member which has a fourth attribute and is formed under the first cushion member and is in contact with the first cushion member, wherein an adhesive agent adheres to at least a part of a surface of the first cushion member, which is not in contact with the second cushion member.

12. The electronic device of claim 11, wherein the third attribute includes a characteristic satisfying a condition that a density is greater than or equal to 0.6 g/cm3, and the fourth attribute includes a characteristic satisfying a condition that a density is smaller than or equal to 0.4 g/cm3.

13. The electronic device of claim 11, further comprising a coating layer, wherein the coating layer is formed between the cushion layer and the adhesive agent.

14. The electronic device of claim 11, wherein surfaces of the first cushion member and the second cushion member, which are in contact with each other, have serrated shapes engaged with each other.

15. The electronic device of claim 11, wherein an at least partial area of the first layer and the second layer are foldable, and
- wherein a cutting groove is formed in an at least partial area of the cushion layer corresponding to an area under the at least partial area that is foldable.

16. The electronic device of claim 1, wherein one adhesive member among the first adhesive member and the second adhesive member adheres to the first layer and the second layer,
- wherein the other adhesive member, which is different from the one adhesive member among the first adhesive member and the second adhesive member, is formed to adhere to one of the first layer and the second layer.

17. The electronic device of claim 1, wherein the second area of the third layer is included in the first area, and
- wherein the second adhesive member is made of a material harder than that of the first adhesive member and includes a plurality of partitioning walls successively arranged therein while being spaced a predetermined interval apart from each other.

* * * * *